US008040878B2

(12) United States Patent
Lometti et al.

(10) Patent No.: US 8,040,878 B2
(45) Date of Patent: Oct. 18, 2011

(54) MULTI-SERVICE TRANSPORT APPARATUS WITH SWITCH FOR INTEGRATED TRANSPORT NETWORKS

(75) Inventors: Alberto Lometti, Merate (IT); Silvano Frigerio, Cantu' (IT); Marco Lenti, Monza (IT); Silvio Cucchi, Gaggiano (IT); Marisa Treu, Magenta (IT); Giulio Gladiali, Milan (IT); Paolo Rossi, Milan (IT)

(73) Assignee: Alcatel Lucent, Paris (FR)

( * ) Notice: Subject to any disclaimer, the term of this patent is extended or adjusted under 35 U.S.C. 154(b) by 101 days.

(21) Appl. No.: 12/381,970

(22) Filed: Mar. 18, 2009

(65) Prior Publication Data

US 2009/0180472 A1    Jul. 16, 2009

Related U.S. Application Data

(63) Continuation of application No. 11/190,811, filed on Jul. 28, 2005, now abandoned, which is a continuation of application No. 11/366,426, filed on Mar. 3, 2006, now abandoned.

(30) Foreign Application Priority Data

Sep. 22, 2004   (EP) .................................... 04292277
Mar. 4, 2005    (EP) .................................... 05290508

(51) Int. Cl.
*H04L 12/28* (2006.01)

(52) U.S. Cl. .......................... 370/354; 370/392; 370/401

(58) Field of Classification Search .......... 370/498–545, 370/506, 404, 352–356, 360–385, 389–427; 398/58–65, 75–76, 89–97
See application file for complete search history.

(56) References Cited

U.S. PATENT DOCUMENTS

| 5,594,727 | A  | * | 1/1997  | Kolbenson et al. ........... 370/442 |
| 6,819,686 | B1 | * | 11/2004 | Frannhagen et al. ......... 370/535 |
| 6,940,850 | B2 | * | 9/2005  | Park .............................. 370/369 |
| 7,164,860 | B1 | * | 1/2007  | Narvaez et al. ................ 398/58 |
| 2003/0228093 | A1 | * | 12/2003 | Notani ........................... 385/24 |
| 2004/0105459 | A1 | * | 6/2004  | Mannam ....................... 370/465 |

* cited by examiner

*Primary Examiner* — Pao Sinkantarakorn
*Assistant Examiner* — Iqbal Zaidi
(74) *Attorney, Agent, or Firm* — Carmen Patti Law Group, LLC

(57) ABSTRACT

A multi-service transport apparatus for integrated transport networks that may have an electrical matrix, termination function means handling signals incoming at said apparatus input, a plurality of termination function means interfacing different layers, and adaptation function means. The termination function means handling incoming signals are implemented in input/output port devices; the termination function means interfacing different layers and said adaptation function means are implemented in adapter devices. The matrix performs exclusively the switching of the incoming signals that are already terminated and adapted by said input/output port devices and by said adapter devices and it is transparent with respect to the signal format. The switch may have a time division multiplexing matrix provided with a number of matrix inputs and a number of matrix outputs; source address generators, connected to matrix outputs of the time division multiplexing matrix.

31 Claims, 14 Drawing Sheets

MULTI-SERVICE TRANSPORT APPARATUS WITH SWITCH FOR INTEGRATED TRANSPORT NETWORKS

CROSS-REFERENCE TO RELATED APPLICATIONS

This application is a continuation of U.S. patent application Ser. No. 11/190,811, filed Jul. 28, 2005 and U.S. patent application Ser. No. 11/366,426, filed Mar. 3, 2006.

This application is based on, and claims the benefit of U.S. patent application Ser. No. 11/190,811, filed Jul. 28, 2005, which is incorporated by reference herein and which is based on, and claims the benefit of European Patent Application No. 04 292 277.3 filed on Sep. 22, 2004, which is incorporated by reference herein.

This application is based on, and claims the benefit of U.S. patent application Ser. No. 11/366,426, filed Mar. 3, 2006, which is incorporated by reference herein and which is based on, and claims the benefit of European Patent Application No. 05 290 508.0 filed on Mar. 4, 2005, which is incorporated by reference herein.

TECHNICAL FIELD

The present method and apparatus relates to the field of telecommunications and, in particular, to the field of network elements. Even more in particular, the present method and apparatus relates to a multi-service transport apparatus suitable for handling signals coming from an integrated transport network.

The present method and apparatus also relates to the field of switches for telecommunication networks. More particularly, the present method and apparatus relates to a switch for integrated telecommunication networks, which is adapted to switch both TDM flows and packets. The present method and apparatus further relates to a method for switching both TDM flows and packets.

BACKGROUND

Transmission networks can be classified according to their geographical extension, their topology and the transmission protocol they use for transmitting information.

In particular, according to the geographical extension it is possible to identify, for instance, two types of transmission network:

Local Area Network (LAN), where network nodes are rather close to each other, for example inside the same building or group of buildings; and Wide Area Network (WAN), used for interconnecting LANs that are far from each others.

From the topological point of view, LANs have usually a bus or ring configuration, while WANs may have nodes arranged according to a mesh, a bus or a ring configuration.

With regard to the transmission protocol, networks may be distinguished in circuit switched networks and packet switched networks. In circuit switched networks, information is transported from a source node to a destination node by a continuous stream of digital signals propagating through the network at a constant rate; the stream is organized in a sequence of frames with fixed length and format. Information transmission starts only when a "circuit" (namely, a route interconnecting the source node to the destination node) has been established in the network. The circuit is used to transmit the whole stream of digital signals. SDH/Sonet synchronous protocol and PDH asynchronous protocol are examples of circuit switched network standards.

In contrast, in a packet switched network the information is exchanged in bursts called "packets". Each packet includes the address of its destination node and is individually transmitted through the network. Each packet is routed node by node according to the traffic conditions; at the destination node, the correct packet sequence is reconstructed to recover the information. Packet length may vary depending on the information type (voice, data or video) and on network features (bit rate, network extension). Ethernet and Resilient Packet Ring (RPR) are examples of packet switched network standards.

Nowadays, there exist integrated transport networks, i.e. networks comprising different LANs interconnected by backbones, where LANs may provide different services, each service being supported by a different network standard, either circuit switched or packet switched. For instance, a single integrated transport network may include LANs providing both Ethernet- and ATM-supported services; in turn, data related to these services may be mapped, for example, according to the SDH/Sonet standard and may be transported along the network backbones according to that standard.

In an integrated transport network, each standard, which is supported by the network, may be represented by a different network layer. Each layer N is interfaced with the two adjacent layers N+1 and N−1. Layer N+1 is Client of layer N, while layer N−1 is Server of layer N. In other words, a signal according to layer N+1 can be suitably mapped and transported in a signal structure according to layer N. In turn, the signal structure according to layer N can be suitably mapped and transported into a signal structure according to layer N−1.

For example, an integrated transport network comprising SDH and Ethernet signals can be represented by a three-layer hierarchy, where Ethernet is layer #3, SDH-Lower Order is layer #2 and SDH-Higher Order is layer #1. In other words, Ethernet is Client of SDH-Lower Order, which is in turn Client of SDH-Higher Order.

The simultaneous presence of a plurality of network layers, i.e. of a plurality of network standards supported by the same integrated transport network, requires multi-service transport apparatuses, suitable for handling all the signals coming from the integrated network at each network layer. In particular, a multi-service transport apparatus should be able to carry out all of the signal processing functions, such as termination, adaptation and switching, according to each network layer. For instance, a multi-service transport apparatus should be able to extract a group of Ethernet packets from an incoming SDH-Higher Order frame, to perform a packet-switching operation on the packets and finally either to transmit the packets over a LAN or to map the packets back in a SDH-Higher Order frame and to transmit the frame through the backbone. Hence, a multi-service transport apparatus comprises input/output ports, switch elements (such as TDM matrices or packet matrices) and interfaces between layers. With such an equipment, the apparatus is able to interconnect each input of each network layer to each output of the same layer and of the other layers.

Different multi-service transport apparatuses are known in the art. These known apparatuses are based on different approaches, depending on the integration level of the signal processing functions related to different layers: "multi network element" approach; and "single network element" approach.

The "multi network element" approach consists in assembling a plurality of single-service shelves, each shelf comprising input/output ports and switch elements, able to manage signals according to one single layer, and interfaces. Yet, such an approach is disadvantageous, since the presence of one shelf for each of the supported layers implies extra-costs, due to a non-optimized exploitation of each shelf and to the management of different shelves, and an increase of the overall dimension of the apparatus.

Lower costs and dimensions can be obtained by a multi-service transport apparatus according to the "single network element" approach, where processing functions related to different layers are integrated into a single shelf. Three different multi-service apparatuses are known. Each of them is based either on a TDM matrix, a packet matrix; or a TDM matrix and a packet matrix.

In the first case, the multi-service apparatus comprises a main TDM matrix (for example a matrix for SDH/Sonet switching) and a plurality of secondary packet matrices with smaller dimensions. Yet, this approach exhibits some disadvantages, such as a reduced scalability of the packet traffic.

In the second case, the apparatus is based on a main packet matrix and on a plurality of input/output ports, the ports comprising interfaces to convert all the incoming traffic into packet-switchable signals. This approach however, even though advantageous with respect to the previous one in terms of scalability, is a non-layered approach, i.e. it is not consistent with the layered structure of the transport network. This prevents the implementation and the coexistence of some network protection mechanisms. Moreover, the interfaces included into the input/output ports are very complex and expensive.

In the third case the apparatus comprises two main matrices, i.e. a TDM matrix and a packet matrix, with input/output ports suitable to direct the incoming traffic on the matrices and means to interface the two matrices. This approach is disadvantageous, since it implies extra-costs due to the presence of the two matrices and of the additional functions aimed to direct the traffic.

As already mentioned, intermediate nodes are responsible for routing information towards respective destination nodes. For instance, intermediate nodes may cross-connect, multiplex, regenerate or amplify information.

In particular, nodes cross-connecting and/or multiplexing information, such as cross-connects and add-drop multiplexers, comprise switches. A switch is a device which is adapted to receive information through a plurality of input lines and selectively send the information to a plurality of output lines, according to the destination node of such information.

In a packet-switched network, a switch (which is also termed packet switch) switches each packet according to the content of its overhead. Typically, each input line of a packet switch is provided with a number of buffers, which equals the number of output lines. Each packet incoming from a given input line is stored into the buffer corresponding to the output line indicated by the overhead content. In each buffer, packets are stored in a queue, where they wait to be taken by the respective output line. An output controller is provided for each set of buffers associated to a same output line. The output controller receives from each buffer connected to it information about the state of the queue (number of packets, packet sizes, etc.). According to these information, each output controller instructs its respective output line to take packets from the buffers associated thereto. The output controller determines the order according to which packets must be taken, in order to avoid buffer saturation and switch congestion.

In a packet switch, switching is thus dynamically controlled, according to the overhead content of each incoming packet.

Besides, in synchronous circuit-switched networks, a switch (which is termed TDM switch) switches each tributary channel according to its position into the TDM flow.

A TDM switch comprises a TDM matrix, which is typically implemented as a memory. Each matrix input is adapted to write in predetermined portions of the memory in predetermined time slots. Besides, each matrix output is adapted to read from predetermined portions of the memory in predetermined time slots. The predetermined time slots are estimated by recovering the reference clock signal of the synchronous network, so that writing and reading operations are synchronized.

Each TDM switch has a routing table indicating, for each matrix output, an ordered list of the tributary channels that must be taken by the matrix output. The routing table of a TDM switch is static, i.e. it is modified only when changes in the channel configuration occur (e.g. one or more tributary channels are switched on or switched off).

Each matrix output is provided with a source address generator. The source address generator of each matrix output generates, by processing the information contained into the static routing table, an ordered list of source addresses. A source address is a memory address indicating the position of the memory portions containing the tributary channel to be taken, as it will be described in greater detail herein after.

SUMMARY

Embodiments of the present method and apparatus may provide a multi-service transport apparatus for integrated transport networks, which overcomes the aforesaid problems of the prior art.

In particular, embodiments of the present method and apparatus may provide a multi-service transport apparatus for integrated transport networks able to carry out all the signal processing functions, such as termination, adaptation and switching, according to the standards for integrated transport networks, the multi-service transport apparatus allowing interconnection between all the layers of the integrated transport network without damaging its layered structure, and such that all the cascaded protection schemes provided by the different layers can be implemented.

Still embodiments of the present method and apparatus may provide a multi-service transport apparatus for integrated transport networks with no extra-costs due to the duplication of the devices and with an optimized exploitation of the devices provided inside the multi-service apparatus.

Such embodiments are achieved, according to the present method and apparatus, by a multi-service transport apparatus according to claim 1. Further advantageous features of the present method and apparatus are set forth in the dependent claims. All the claims are deemed to be an integral part of the present description.

The embodiments of the present method and apparatus may provide a multi-service apparatus for an integrated transport network, which comprises a plurality of signal layers. The apparatus comprises an electrical matrix, termination function means handling signals incoming at apparatus inputs, a plurality of termination function means interfacing different layers, and adaptation function means. The termination function means handling incoming signals are implemented in input/output port devices; furthermore, the termination function means interfacing different layers and the adaptation function means are implemented in adapter devices. The matrix performs exclusively the switching of the incoming signals that are already terminated and adapted by the input/output port devices and by the adapter devices and it is transparent with respect to signal format.

According to one embodiment, a separate adapter device is provided for at least one pair of termination and adaptation function means between adjacent layers. The adjacent layers could be: Ethernet layer & Multi Protocol Label Switching layer; Multi Protocol Label Switching layer & Resilient Packet Ring layer; Resilient Packet Ring layer & SDH Lower Order layer; SDH Lower Order layer & SDH Higher Order layer; and SDH Higher Order layer & Optical Data Unit layer.

According to another embodiment, a separate adapter device is provided for at least one pair of termination and adaptation function means between non-adjacent layers. The non adjacent layers could be: Multi Protocol Label Switching layer & SDH Higher Order layer; Multi Protocol Label Switching layer & Optical Data Unit layer; Resilient Packet Ring layer & SDH Higher Order layer; and Resilient Packet Ring layer & Optical Data Unit layer.

According to another embodiment, a separate adapter device is provided for at least one pair of termination and adaptation function means between adjacent layers and wherein a separate adapter device is provided for at least one pair of termination and adaptation function means between non-adjacent layers.

Preferably, at least one of the input/output port devices comprises packet termination function means. Preferably, there is also a first backpanel driver for transmitting terminated packet signals to the matrix for performing packet layer switching.

Preferably, the apparatus further comprises a selector, the selector receives packet signals and outputs the received packet signals either to the packet termination function means or to a plug-in module which is apt to adapt the packet signals into time division multiplex signals and terminate the packet signals on time division multiplex layer.

Typically, the plug-in module comprises: Lower Order Path Termination means, Higher Order Path Termination means; and Optical Data Unit termination means.

The first backpanel driver transmits signals from the plug-in module to the matrix for performing time division multiplex layer switching.

Preferably, the packet termination function means, the selector and the plug-in module are arranged on a first board.

In the apparatus according to the present method and apparatus, at least one of the input/output port devices comprises TDM termination function means and processing means. Furthermore, the apparatus comprises a second backpanel driver for transmitting the terminated/processed TDM signals to the matrix for performing TDM layer switching. Preferably, the TDM termination function means and the processing means are arranged on a second board.

The apparatus further comprises a Higher Order Adaptation board receiving Lower Order TDM signals and outputting higher order TDM signals, the Higher Order Adaptation board in turn comprising an adapter device comprising adaptation function means and termination function means.

A peculiar characteristic of the present method and apparatus is that the electrical matrix has a total switching capacity, which could be shared by different layer signals.

In a preferred embodiment, the apparatus comprises an optical switch device transparent with respect to incoming optical signal format. The optical switch device has a total optical switching capacity, which could be shared by different layer signals.

Hence, in a multi-service transport apparatus according to the present method and apparatus, the switching function, performed by a switch device (matrix), is substantially separated from the termination and adaptation functions. In other words, the switch device is transparent to the format of the incoming signals, as signals at the input of the switch device are already terminated and adapted by the input/output port device and by the adapter device. Accordingly, the switch device is able to switch signals coming from different network layers; no more multiple switch elements (TDM or packet matrices) are required to perform switching on different layers.

The hierarchical layered structure of the network, managed by the adapter devices, is then preserved.

Moreover, the traffic throughput corresponding to each layer can be easily scaled by equipping a proper number of input/output port devices and of adapter devices.

Further, according to the type of input/output port device connected to the switch device, it is possible to share the overall traffic throughput offered by the switch device among the different layers, according to the traffic throughput required by each layer.

Furthermore, embodiments of the present method and apparatus may provide a switch for integrated telecommunication networks which is able to switch both TDM flows and packets by means of a single switching matrix and wherein the exploitation of the switch resources is optimized and independent from the ratio between TDM flow capacity and packet capacity.

Embodiments of the present method and apparatus may also provide a switch for integrated telecommunication networks wherein TDM flows and packets undergo a fixed delay.

Embodiments of the present method and apparatus may further provide a switch for integrated telecommunication networks wherein multicast and broadcast transmission can be easily implemented, both for TDM flows and for packets.

According to a first aspect, embodiments of the present method and apparatus may provide a switch for telecommunication networks comprising a time division multiplexing matrix provided with a number of matrix inputs and a number of matrix outputs; and source address generators connected to matrix outputs of the time division multiplexing matrix. The switch further comprises input modules, each of the input modules being adapted to generate a fixed size block, the block comprising a number of packets arranged according to a predefined order; matrix input processing modules, each of the matrix input processing modules being connected to an input module to receive therefrom the fixed size block, and each of the matrix input processing modules being further connected to a matrix input; and a dynamic provisioning module, which is adapted to receive from the matrix input processing modules routing information comprised in the packets, generate, according to the routing information, a dynamic routing table, and supply the dynamic routing table to the source address generators.

Preferably, it further comprises a static provisioning module which is adapted to supply a static routing table to the source address generators.

According to one embodiment, the fixed size block further comprises a portion of time division multiplexing flow. In this case, the switch further comprises a clock module for recovering from the time division multiplexing flow a reference clock signal, and supplying the reference clock signal to source address generators.

Preferably, the routing information is sent to the dynamic provisioning module according to the predefined order.

According to one embodiment, the predefined order corresponds to the order of matrix outputs to which packets are addressed.

Preferably, the switch is at least partially implemented in an application specific integrated circuit.

According to a second aspect, embodiments of the present method and apparatus may provide a method of switching information flows in a telecommunication network, the method comprising: generating fixed size blocks comprising a number of packets which are arranged according to a predefined order; taking routing information from the packets, generating, according to the routing information, a dynamic routing table; generating source addresses according to the dynamic routing table; and supplying the source addresses to matrix outputs of a time division multiplexing matrix.

The source addresses are preferably generated according to a static provisioning table.

According to one embodiment, the fixed size blocks are generated with a portion of a time division multiplexing flow.

The method preferably comprises: recovering a reference clock signal from the time division multiplexing flow; and timing the step of generating source addresses according to the reference clock signal.

The step of taking routing information preferably comprises taking routing information according to the predefined order.

A French patent application filed by the same Applicant of the present application, which was filed before the present patent application, but published afterward, describes a switching system comprising input modules each connected to a switching matrix and to a corresponding controller. Each input module organizes packets that it receives into digital data blocks with a fixed size, and makes transfers of these blocks by successive cycles to the matrix. Each of these blocks is organized into groups of digital data, these groups having corresponding modifiable sizes and being stored according to a predetermined order and associated with the corresponding output ports in the system. Each of these groups is formed of packets to be sent to a single corresponding output port. Any block transfer to the matrix is accompanied by transmission of information representative of the corresponding sizes of the groups of the transferred block to the controller, and the groups of each transferred block are switched to their corresponding destination output ports as a function of this information representing the sizes.

This French patent application neither describes nor suggests to provide a switch for integrated networks for switching both TDM flows and packets. Furthermore, this patent application neither describes nor suggests to dynamically generate, according to overhead of incoming packets, source addresses of packets, thus using the source addresses to control the matrix outputs of a TDM matrix for switching the packets.

On the contrary, according to the present method and apparatus, the input modules arrange packets according to a predefined order; the matrix input processing modules drop the overheads of the packets into the same predefined order, and send them to the dynamic provisioning module. The dynamic provisioning module processes the overheads and provides a dynamic routing table, which allows the source address generators to generate source addresses for the packets.

Thus, the switch according to the present method and apparatus advantageously allows to avoid duplicating the resources of the switch, thus reducing the device cost.

Moreover, the switch according to the present method and apparatus advantageously allows to optimize the exploitation of the switch resources, independently from the composition of the incoming traffic flow.

Besides, the switch according to the present method and apparatus advantageously allows to easily implement multicast and broadcast transmission, as the TDM matrix is controlled through its matrix outputs.

Besides, the switch according to the present method and apparatus advantageously allows to introduce a fixed delay both on TDM traffic and on packet traffic, as traffic management by means of queues is avoided.

Further features and advantages of the present method and apparatus will become clear by the following detailed description, given by way of example and not of limitation, to be read with reference to the accompanying drawings.

DESCRIPTION OF THE DRAWINGS

The features of the embodiments of the present method and apparatus are set forth with particularity in the appended claims. These embodiments may best be understood by reference to the following description taken in conjunction with the accompanying drawings, and in which:

DETAILED DESCRIPTION

Embodiments of the present method and apparatus relate to the concept of a multi-service node, which switches packet and TDM traffic both using a single switch matrix that is transparent with respect to the signal format. As mentioned above, an integrated transport network deals with different transmission standards, either circuit switched or packet switched. All the transmission standards supported by the network are organized into a hierarchical layered structure. A multi-service transport apparatus for integrated transport network thus comprises devices to handle at each network layer all the signals incoming at the input of the apparatus.

Figure 1:
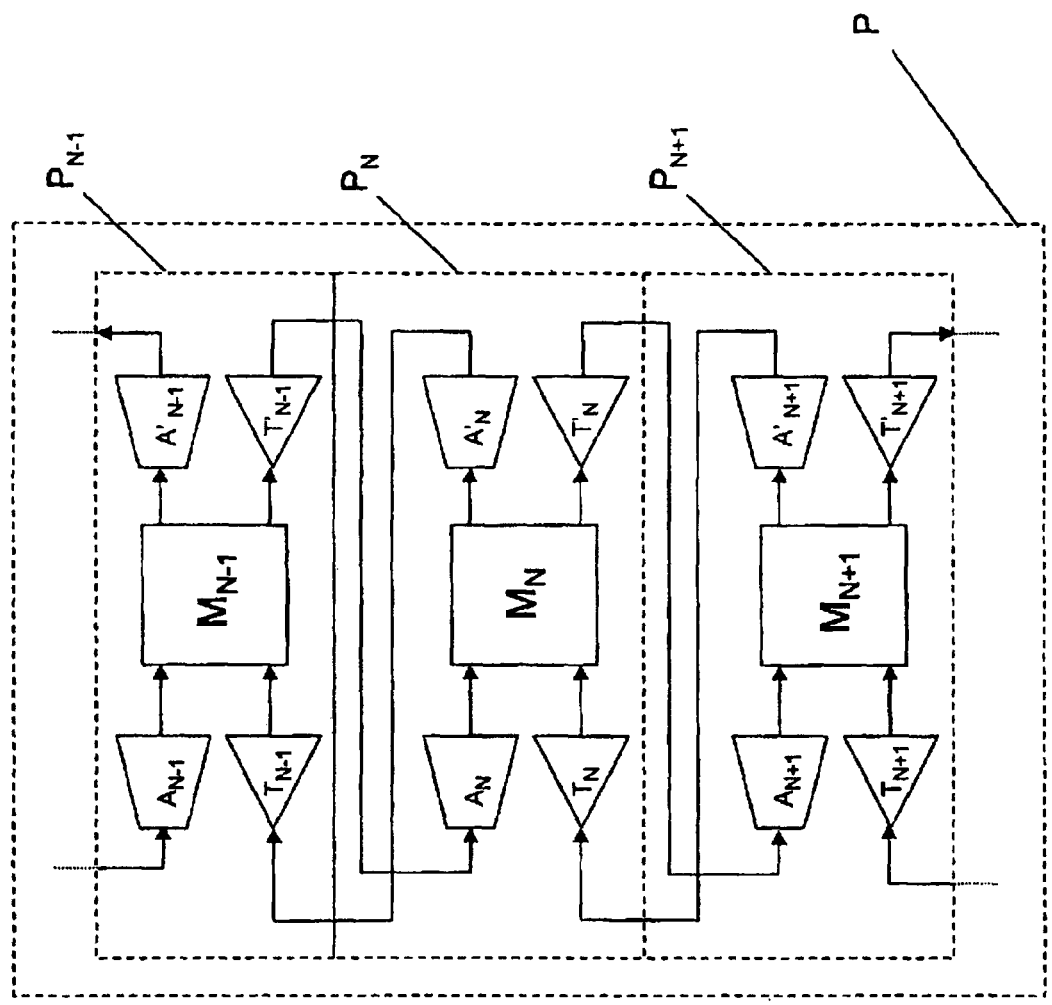
FIG. 1 schematically shows from a logical point of view a portion of a multi-service transport apparatus for an integrated transport network comprising at least three layers.

FIG. 1 schematically shows, from a logical point of view, a portion of a multi-service transport apparatus P for an integrated transport network comprising at least three layers N+1, N and N−1. Layer N+1 is Client of layer N, which is in turn Client of layer N−1. In other words, layer N−1 is Server of layer N, which is in turn server of layer N+1.

The apparatus P comprises, for each of the above-mentioned layers, a processing block $P_{N+1}$, $P_N$ and $P_{N-1}$. Each block $P_{N+1}$, $P_N$ and $P_{N-1}$ comprises:

an adaptation function sink ($A_{N+1}$, $A_N$ and $A_{N-1}$) from the Server layer;

an adaptation function source ($A'_{N+1}$, $A'_N$ and $A'_{N-1}$) to the Server layer;

an input termination function ($T_{N+1}$, $T_N$ and $T_{N-1}$);

an output termination function ($T'_{N+1}$, $T'_N$ and $T'_{N-1}$); and a switch element ($M_{N+1}$, $M_N$ and $M_{N-1}$) suitable to perform switching at each of the layers (e.g. TDM matrix or packet matrix).

It has to be noticed that the apparatus P comprises both termination and adaptation functions to handle signals coming at the input of each block $P_N$ from the network, and termination and adaptation functions suitable to interface blocks of different layers. For clarity reasons, FIG. 1 shows only the termination and adaptation functions suitable to interface blocks of adjacent layers.

A signal according to layer N which is incoming at the input of the apparatus P, is firstly received by suitable termination/adaptation functions (not shown in FIG. 1) of the block $P_N$. The signal can then be switched at layer N by the switch element $M_N$ and finally go out of the apparatus through suitable termination/adaptation functions (not shown in FIG. 1) of the block $P_N$.

Alternatively, the signal according to layer N may be received by suitable termination/adaptation functions (not shown in FIG. 1) of the block $P_N$, then it can be switched by the switch element $M_N$ and finally adapted by the adaptation function $A'_N$ which, together with the termination function $T_{N-1}$, allows the signal to pass from the Client layer N to the Server layer N−1. Then, the signal may be switched by the switch element $M_{N-1}$, and finally go out of the apparatus P at layer N−1 through suitable termination/adaptation functions (not shown in FIG. 1) of the block $P_{N-1}$.

Alternatively, the signal according to layer N may be received by suitable termination/adaptation functions (not shown in FIG. 1) of the block $P_N$, then it can be switched by the switch element $M_N$ and finally it can pass from the Server layer N to the Client layer N+1 through the termination function $T'_N$ and the adaptation function $A_{N+1}$. Then, the signal may be switched by the switch element $M_{N+1}$ and finally go out of the apparatus P at layer N+1 through suitable termination/adaptation functions (not shown in FIG. 1) of the block $P_{N+1}$.

On the basis of the above considerations, it is clear that in a multi-service apparatus of the type shown in FIG. 1 each input of layer N is interconnected to all the output of layer N and of layers N−1 and N+1. Moreover, in such a multi-service apparatus, it is possible to perform switching according to each layer on all the incoming signals according to all the three layers, thanks to the termination and adaptation functions allowing the signal to pass from each layer to the others.

Figure 2:
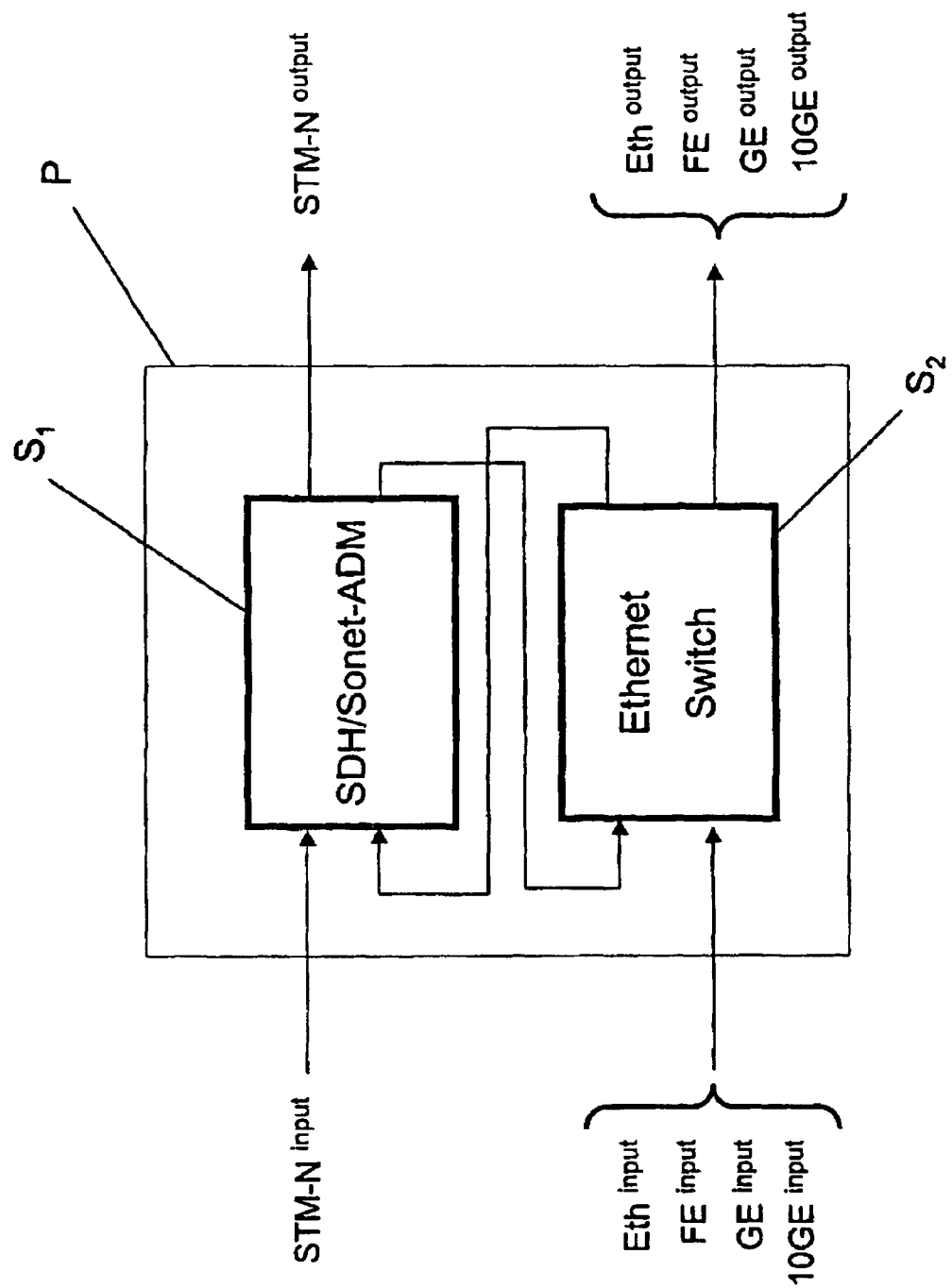
FIG. 2 schematically shows a known multi-service transport apparatus implemented according to the "multi network element" approach.

FIG. 2 schematically shows a known multi-service transport apparatus implemented according to the "multi network element" approach. According to this approach, the apparatus P is obtained by assembling a number of shelves, each shelf comprising the processing functions according to one single layer.

In particular, the multi-service apparatus P shown in FIG. 2 comprises two shelves $S_1$ and $S_2$. The first shelf $S_1$ comprise all the processing functions according to the SDH/Sonet server layer of the network; the second shelf $S_2$ includes all the processing functions according to the Ethernet Client layer of the network. $S_1$ is then substantially an SDH/Sonet Add-Drop Multiplexer (SDH/Sonet ADM), while $S_2$ is substantially an Ethernet Switch.

Hence, the multi-service apparatus P shown in FIG. 2 allows to receive at its input either a TDM signal STM-N$^{input}$ from the SDH/Sonet layer, or packet signals Eth$^{input}$, FE$^{input}$, GE$^{input}$, 10 GE$^{input}$ from the Ethernet layer (respectively in its known formats Ethernet, Fast Ethernet, Gigabit Ethernet, 10 Gigabit Ethernet). Each of these signals can be either switched at its own layer, or pass to the other layer and then be switched.

The multi-service apparatus P shown in FIG. 2 suffers from some disadvantages. First, a separate shelf is needed for each network layer, independently from the traffic throughput actually required by each layer. Referring to FIG. 2, for instance, it is assumed that the throughput offered by the SDH/Sonet ADM is completely used, while only a fraction of the throughput offered by the Ethernet Switch is actually exploited. It is also assumed that a further increase of the SDH/Sonet traffic throughput occurs. In the apparatus P shown in FIG. 2, the increase of traffic throughput for SDH/Sonet traffic can be achieved only by replacing the SDH/Sonet ADM with a similar device with increased throughput, but it is not possible to exploit the unemployed capacity offered by the Ethernet Switch. Hence, with a "multi network element" approach the exploitation of the devices already provided inside the apparatus P is not optimized. In addition, having a plurality of independent shelves results in additional costs due to the management of each separate shelf and excessive apparatus dimensions.

Figure 3:
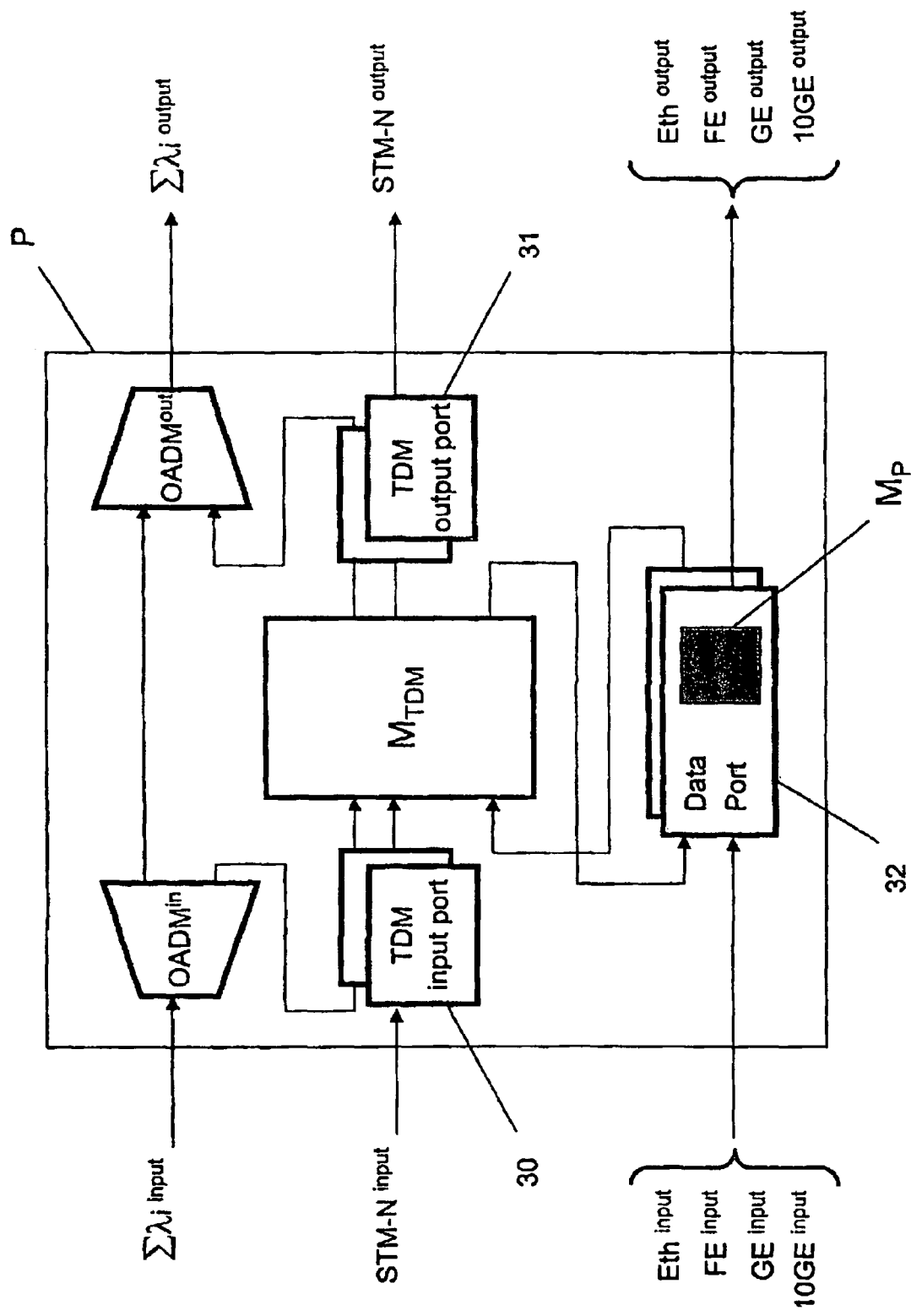
FIG. 3 schematically shows a known multi-service transport apparatus implemented according to the "single network element" approach, based on a TDM matrix.

FIG. 3 schematically shows a multi-service transport apparatus P according to a known "single network element" approach based on a TDM matrix. The apparatus P shown in FIG. 3 comprises:

a main TDM matrix $M_{TDM}$;

an input and output Optical Add-Drop Multiplexer (OADM$^{in}$ and OADM$^{out}$ respectively) to add or drop signals according to the WDM layer;

TDM input/output ports 30 and 31 comprise termination/adaptation functions of the signals entering the apparatus according to the SDH/Sonet layer. The TDM input/output ports 30 and 31 may additionally comprise functions to convert signals coming from the WDM layer to a TDM-switchable format; and data ports 32 which are appended to the matrix $M_{TDM}$, comprising termination/adaptation functions of signals entering the apparatus according to the Ethernet layer and secondary packet matrices $M_P$ to perform packet switching.

Advantageously, this approach fits the hierarchical layered structure of the network. Nevertheless, it exhibits a reduced scalability of the packet traffic throughput. The packet traffic throughput, indeed, depends on the dimension of the packet matrices $M_P$, so it can be increased only by replacing the existing packet matrices $M_P$ with a similar device with increased throughput. On the contrary, increasing the number of packet matrices $M_P$ appended to the main TDM matrix $M_{TDM}$ does not increase the packet traffic throughput, since the packet matrices work in parallel. Moreover, the packet traffic mapped in STM-N frames must always cross the $M_{TDM}$ matrix, even if it has to undergo packet switching.

Figure 4:
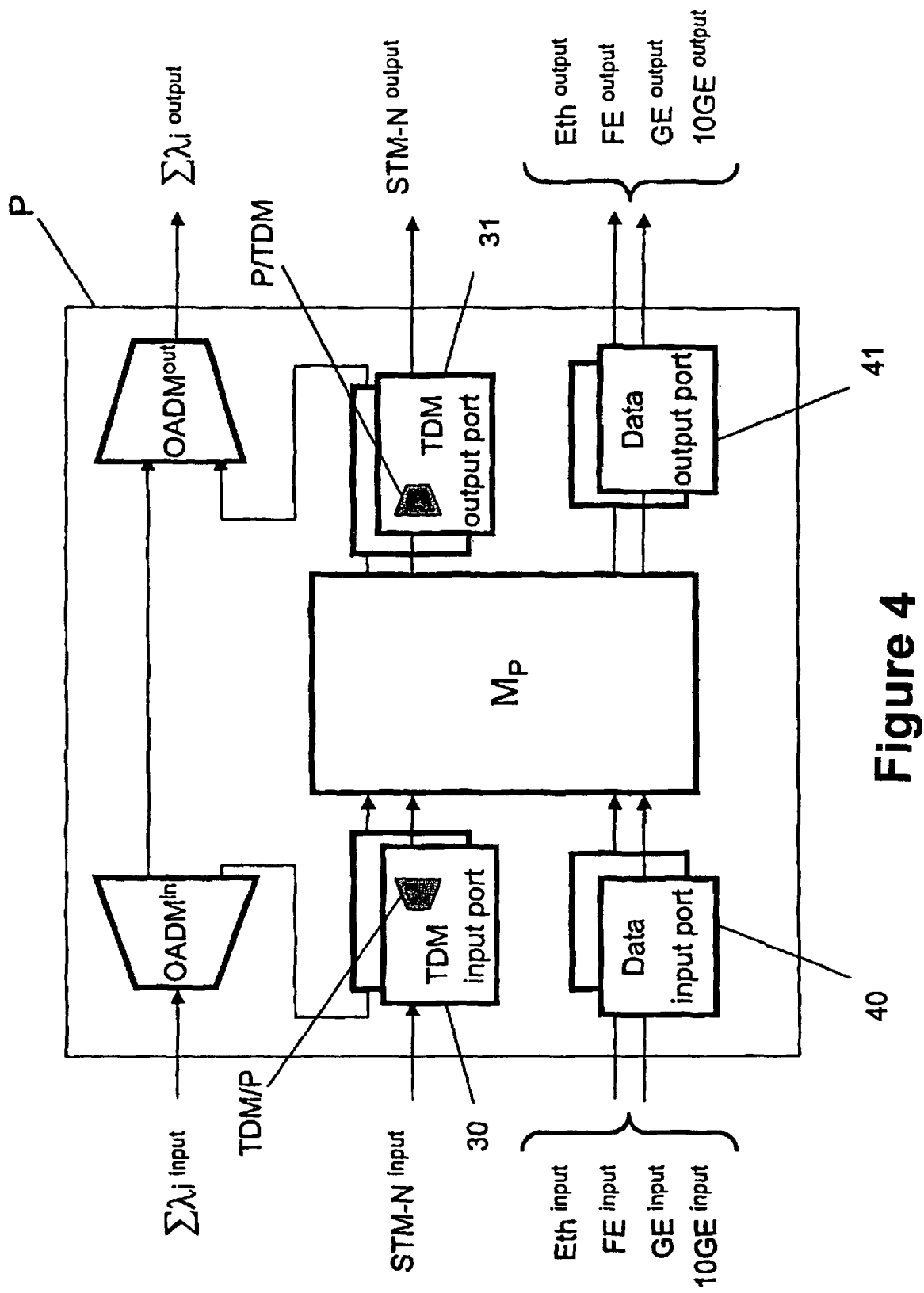
FIG. 4 schematically shows a known multi-service transport apparatus implemented according to the "single network element" approach, based on a packet matrix.
Figure 5:
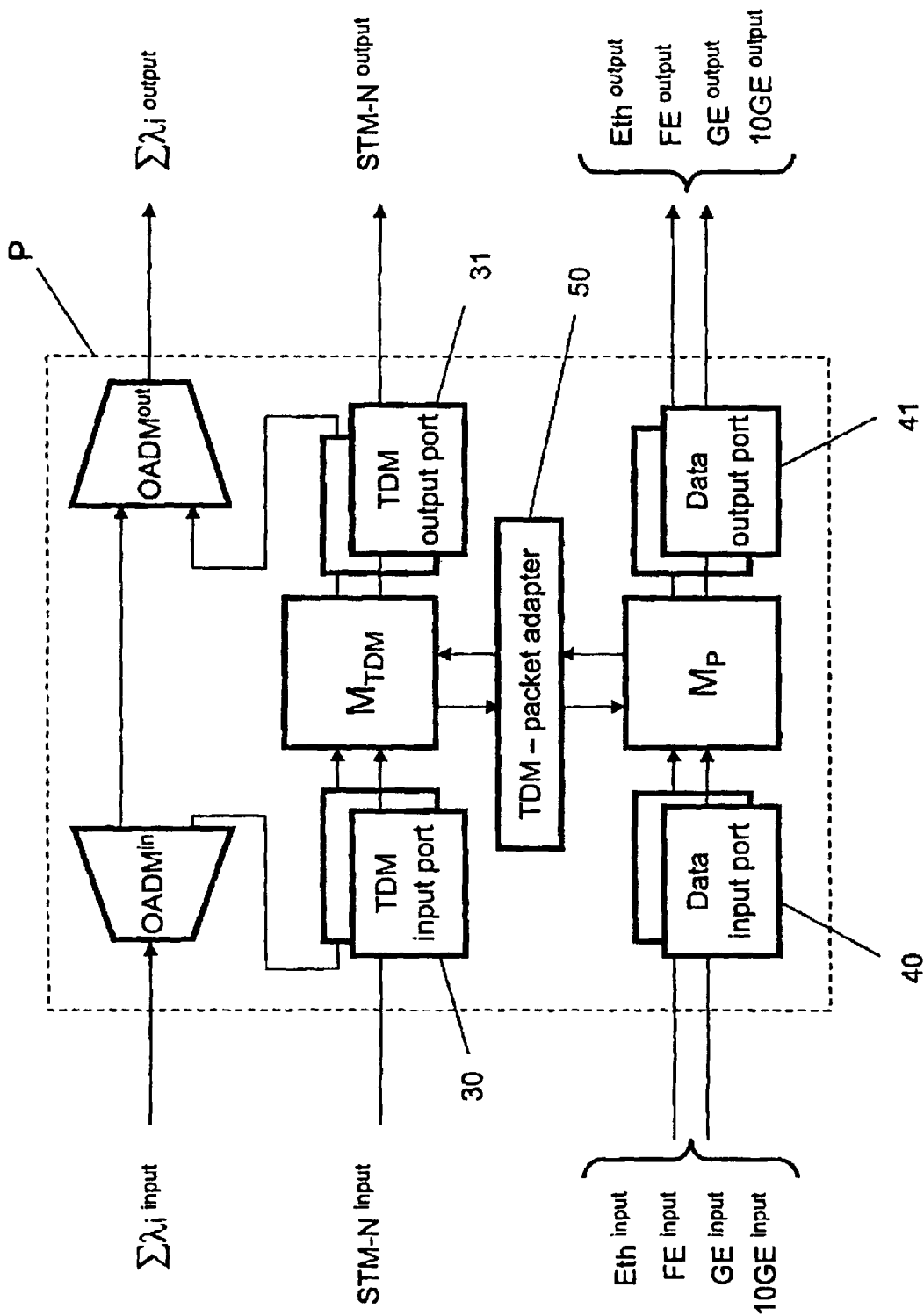
FIG. 5 schematically shows a known multi-service transport apparatus implemented according to the "single network element" approach, based on a TDM matrix and a packet matrix.

Further approaches for providing multi-service transport apparatus are known; FIGS. 4 and 5 schematically show, respectively, a multi-service transport apparatus according to the known single network elements approach based on a packet matrix (FIG. 4), and on a TDM matrix & a packet matrix. (FIG. 5)

Referring to FIG. 4 the apparatus P includes a packet matrix and means for converting all the incoming traffic in packet-switchable signals. This way, all the switching functions are implemented by the packet matrix.

In particular, the apparatus P includes:

a main packet matrix $M_P$;

an input and an output Optical Add-Drop Multiplexer (OADM$^{in}$ and OADM$^{out}$, respectively) to add and drop signals according to the WDM layer;

TDM input/output ports 30 and 31 including termination/adaptation functions of the signals entering the apparatus according to the SDH/Sonet layer. The ports 30 and 31 additionally comprise TDM/Packet Adaptation functions (TDM/P) and Packet/TDM Adaptation functions (P/TDM) to convert the SDH/Sonet signals in packet signals and vice-versa. In particular, the TDM/Packet Adaptation consists in splitting the continuous stream of incoming STM-N frames in cells, while the Packet/TDM Adaptation consists in assembling the cells to recover the sequence of STM-N frames. The TDM input/output ports 30 and 31 may additionally comprise functions to convert signals coming from the WDM layer to a TDM-switchable format; and data input/output ports 40 and 41 for termination/adaptation of signals according to the Ethernet layer.

The main disadvantages of this approach are the cost of the TDM/Packet Adaptation and Packet/TDM Adaptation functions and the fact that this approach cannot maintain the hierarchical layered structure of the network. Indeed, the TDM and packet switching functions collapse in a single switching function performed by the packet matrix $M_P$, i.e. the functional hierarchy of the layers is not preserved inside the apparatus. This prevents the implementation of the cascaded mechanism of network protection according to the different layers. Finally, the TDM/Packet Adaptation function may either introduce undesired delay on the lower order traffic or lead to an under-utilization of the packet matrix capacity.

FIG. 5 schematically shows a multi-service transport apparatus comprising means to drive the incoming signals on one of the two matrices. In particular, the apparatus P shown in FIG. 5 comprises:

a TDM matrix $M_{TDM}$ and a packet matrix $M_P$;

an input and an output Optical Add-Drop Multiplexer (OADM$^{in}$ and OADM$^{out}$, respectively) to add and drop signals according to the WDM layer ($\Sigma\lambda_i^{input}$, $\Sigma\lambda_i^{output}$);

TDM input/output ports 30, 31 including termination/adaptation functions of the signals entering the apparatus according to the SDH/Sonet layer. The TDM input/output ports 30, 31 may additionally comprise functions to convert signals coming from the WDM layer to a TDM-switchable format;

data input/output ports 40, 41 for termination/adaptation of signals according to the Ethernet layer; and a TDM-packet adapter 50 between the two matrices $M_{TDM}$ and $M_P$.

This approach disadvantageously requires the duplication of the switch elements and extra costs due to the apparatus charged to drive the incoming signals on one of the two matrices. The apparatus according to this approach actually requires an additional overhead for packet traffic over SDH/Sonet, so that this packet traffic can be driven to the TDM-packet adapter 50 and then to the packet matrix $M_P$. Further additional costs are due to the connection of each input of the apparatus P to both matrices.

Figure 6A:
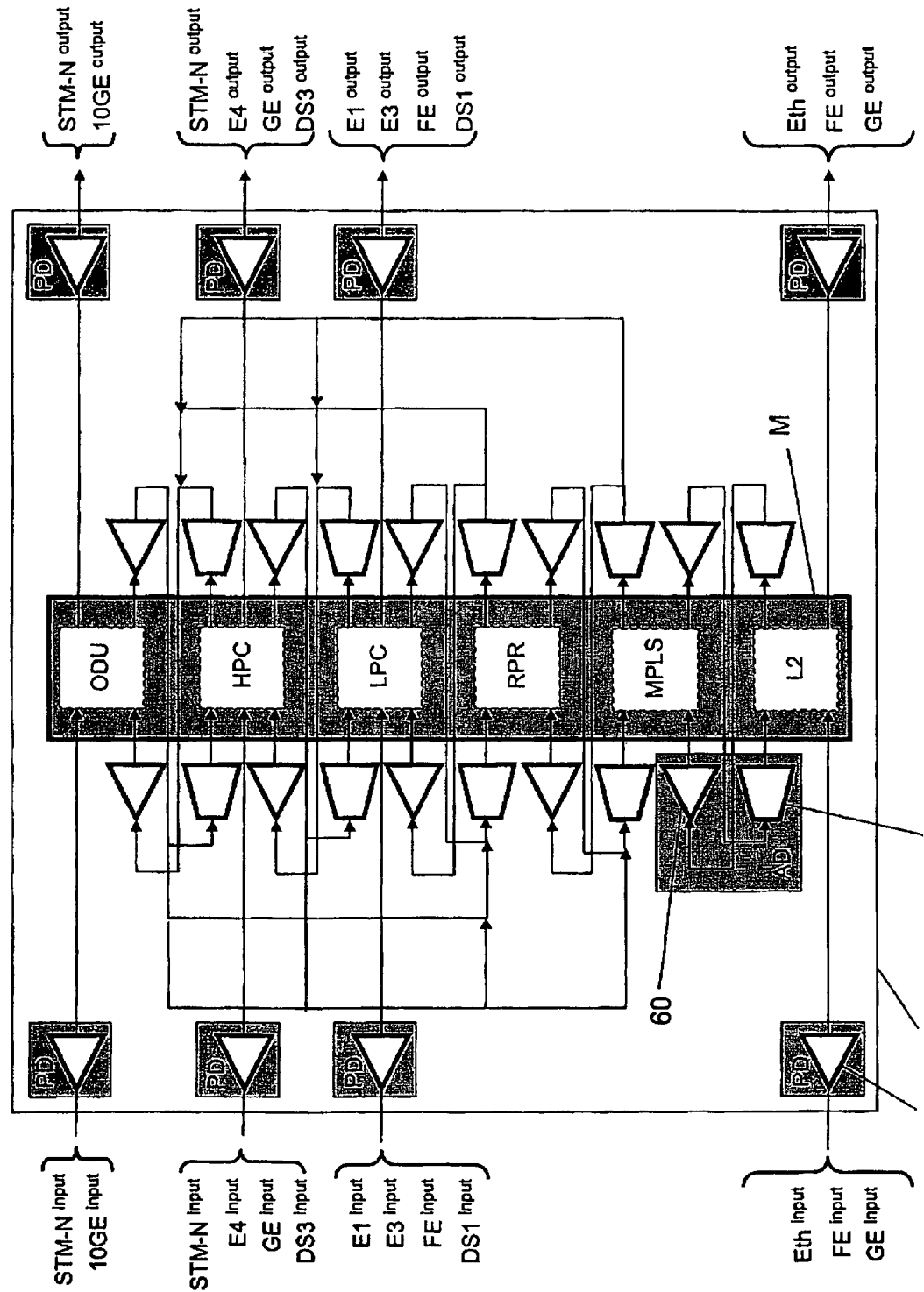
FIG. 6a schematically shows from a logical point of view a first embodiment of a multi-service transport apparatus according to the present method and apparatus.

FIG. 6a shows from a logical point of view a first embodiment of a multi-service transport apparatus for integrated transport networks according to the present method and apparatus. The multi-service apparatus P shown in FIG. 6a comprises a matrix M and a plurality of termination functions 60, 60' (represented in FIG. 6a by triangles) and adaptation functions 61 (represented in FIG. 6a by trapezoids). Only a few termination and adaptation functions 60, 60', 61 have been indicated for clarity. The termination functions can be divided into termination functions 60' handling signals incoming at the input of the apparatus P from the network, and termination functions 60 interfacing different layers, either adjacent or not adjacent.

According to the present method and apparatus, the termination functions 60' according to each network layer are implemented in input/output port devices PD.

Moreover, according to the present method and apparatus, optional termination functions 60 and adaptation functions 61 interfacing different layers are implemented in adapter devices AD. In FIG. 6a, for clarity reasons, a single adapter device AD including a termination function 60 and an adaptation function 61 is shown; however, a separate AD is provided for each pair of termination and adaptation functions between different layers.

Each adapter device AD is independent and can thus be inserted into the apparatus in case of need, i.e. when two or more network layers must be interfaced. Each adapter device may include termination and adaptation functions for interfacing two or more levels, adjacent or not. For instance, the multi-service apparatus P shown in FIG. 6a, given by way of example, comprises an adapter device for each pair of adjacent layers, i.e. an adapter device for interfacing: Ethernet (L2)—Multi Protocol Label Switching (MPLS); MPLS—Resilient Packet Ring (RPR); RPR—SDH Lower Order (LPC); LPC—SDH Higher Order (HPC); and HPC—Optical Data Unit (ODU).

Additionally, the apparatus P shown in FIG. 6a includes adapter devices suitable to interface the MPLS—HPC layers and MPLS—ODU layers, bypassing the RPR and the LPC layers, and adapter devices suitable to interface RPR—HPC layers and RPR—ODU layers, bypassing the LPC layer. Yet, other combinations of interfaced layers are possible.

The implementation of the termination and adaptation functions in dedicated input/output port devices PD and adapter devices AD allows to implement the switching functions according to all the network layers into a single electric switch device or electric matrix M. The matrix M performs exclusively the switching of the incoming signals that are already terminated and adapted by the input/output port devices and by the adapter devices. Thus, the matrix M is able to switch signals according to all the network layers, both circuit switched or packet switched. In other words, the switch function is the same for all the incoming signals, both belonging to TDM traffic and to packet traffic. The switching function is transparent with respect to the signal format.

In FIG. 6a, the matrix M is represented as a group of different switch elements or matrices with different logical function; in particular, in the scheme in FIG. 6a a separate logical function is highlighted for each network layer: L2 switching for Ethernet layer; MPLS switching for MPLS layer; RPR switching for RPR layer; Lower Order Path Connection (LPC) for SDH-Lower Order; Higher Order Path Connection (HPC) for SDH-Higher Order; and ODU switching for ODU layer.

However, this subdivision is merely logical, and not physical. Thanks to the implementation of termination and adaptation functions in separate devices, a physically single matrix M is able to switch with no distinction signals according to different layers. The logical function of each input of the matrix M depends exclusively on the type of input/output port device and/or adapter device connected to it. The traffic throughput of each network layer thus depends on the number of input/output port devices or of adapter devices equipped and connected to the matrix M.

Figure 6B:
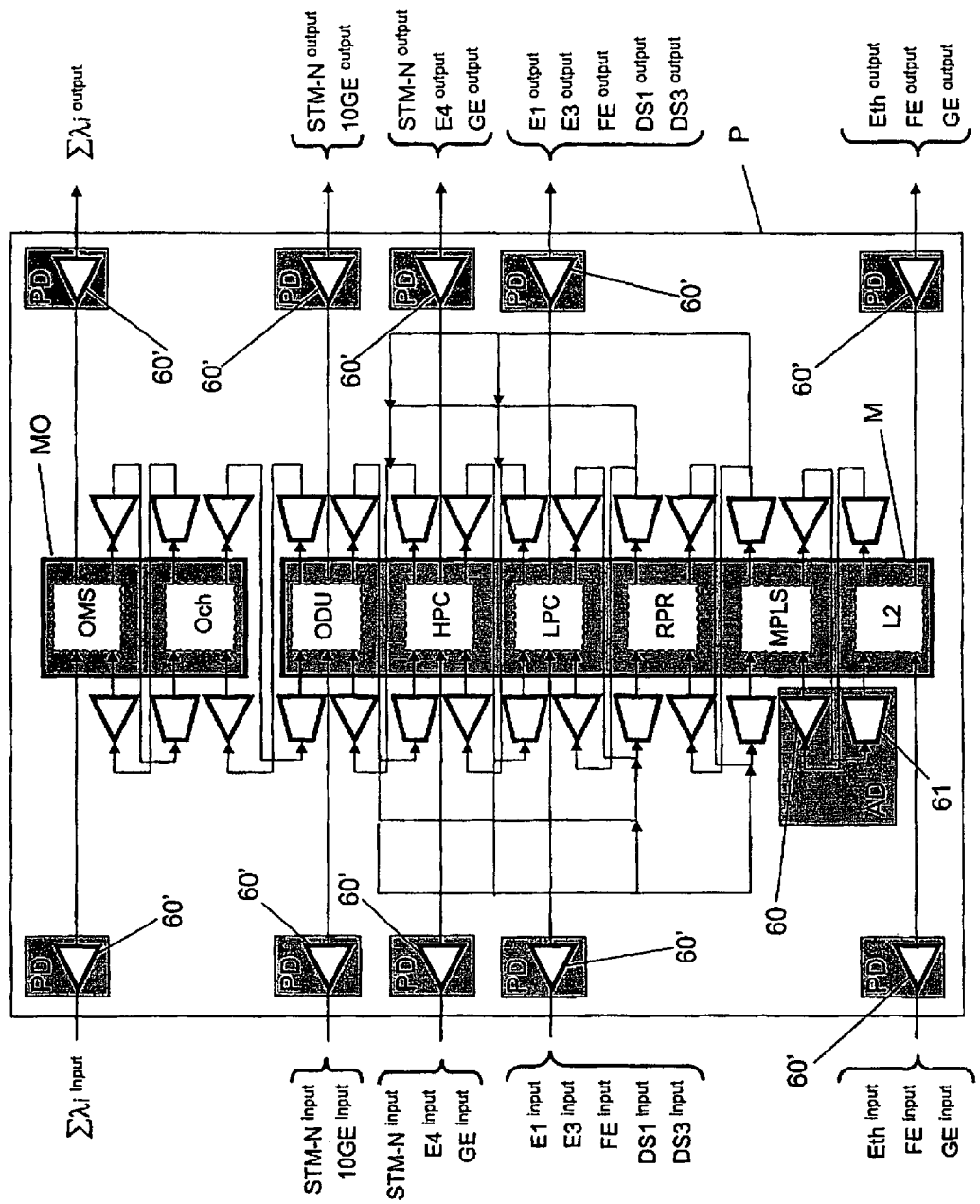
FIG. 6b schematically shows from a logical point of view another embodiment of a multi-service transport apparatus according to the present method and apparatus.

The multi-service apparatus P according to the present method and apparatus may optionally comprise optical switch devices, such as the ones employed in the Optical Multiplex Section (OMS) layer and in the Optical Channel (Och) layer, as shown in FIG. 6b. As for the case of electrical signal processing, also in case of optical signal processing the termination and adaptation functions are implemented in dedicated input/output port devices and adapter devices, so that the two switch functions relating to the two optical layers may be implemented in a single optical switch device, or optical matrix MO, transparent with respect to the format of the optical signal.

The present method and apparatus results in a number of advantages. Firstly, the apparatus exhibits a hierarchical structure managed by the adapter devices and consistent with the hierarchical layered structure of an integrated transport network. It follows that an apparatus according to the present method and apparatus is compatible with the implementation of network protection schemes according to the different layers.

Moreover, the implementation of termination and adaptation functions to interface different layers in adapter cards allows to change the throughput percentage of each single network layer of the overall throughput offered by the matrix M, by simply changing the number of input/output port devices and adapter devices equipped and connected to the matrix M.

Finally, the complexity and the cost of the interface functions between different layers is shared among physically separated elementary adapter devices, which can be inserted one by one into the apparatus only in case of need. This way, the cost of the overall multi-service apparatus is actually proportional to the actual traffic throughput provided by the multi-service apparatus.

Figure 7:
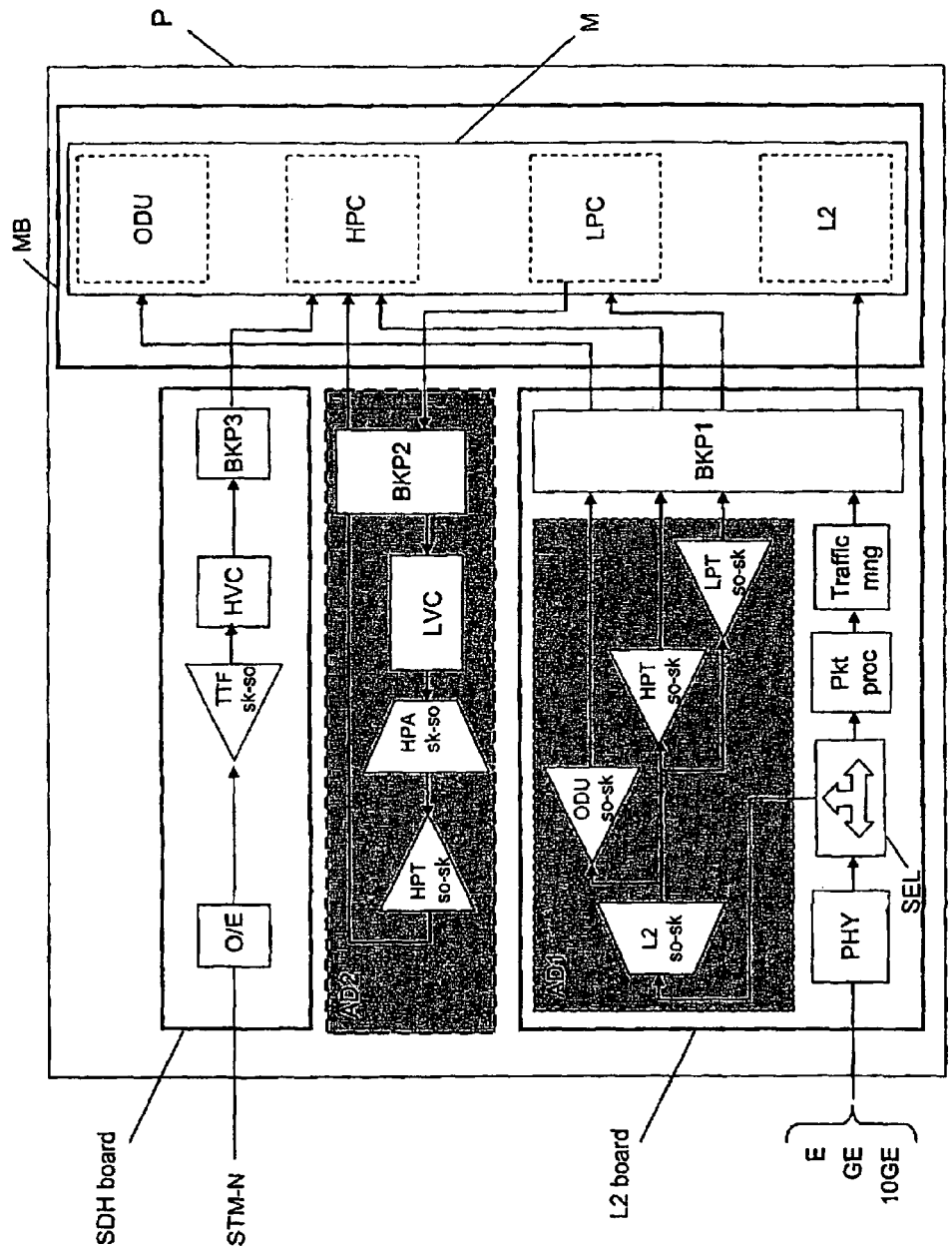
FIG. 7 shows the electrical scheme of a further embodiment of a multi-service transport apparatus according to the present method and apparatus.

FIG. 7 shows the electrical scheme of a further embodiment of a multi-service transport network according to the present method and apparatus. The multi-service apparatus P shown in FIG. 7 comprises:

a matrix board MB comprising an electrical matrix M;

an SDH board, i.e. an input/output port device comprising termination/adaptation functions to terminate and adapt STM-n frames coming from the SDH/Sonet layer; and an L2 board, i.e. an input/output port device comprising termination/adaptation functions to terminate and adapt packets coming from the Ethernet layer.

Optionally, the apparatus P may include adapter devices to interface the different layers. Apparatus P of FIG. 7, for instance, comprises two adapter devices AD1 and AD2, differently implemented. The first adapter device AD1 consists in a Multi-Service Plug-In Module, i.e. a device comprising a plurality of termination and adaptation functions which, in case of need, can be plugged-in on a input/output port device. For example, in the apparatus of FIG. 7 the Multi-Service Plug-In Module is plugged-in on the L2 board, and it comprises termination and adaptation functions to interface Ethernet layer and SDH—Lower Order layer, Ethernet layer and SDH—Higher Order layer, and Ethernet layer and Optical Data Unit layer.

The second adapter device AD2 consists in a Higher Order Adaptation board, i.e. in an adapter device comprising termination and adaptation functions to interface SDH Lower Order and SDH Higher Order layers, implemented on a dedicated board which, in case of need, can be inserted into the apparatus P. The AD2 device can be individually inserted into the apparatus by connecting its input/output directly to the matrix board MB.

Hence, an Ethernet signal (e.g. E, GE or 10 GE) incoming at the input of the apparatus P enters the L2 board through the PHY (physical termination of electric layer 1); afterwards, the Ethernet signal may be:

processed by the packet termination functions laying on the L2 board (Pkt proc, Traffic mng) and then, through the backpanel driver BKP1, be transmitted to the matrix board MB, where a portion of the matrix performs packet switching; or processed by the adaptation and termination functions laying on the adapter device AD1, which allow to convert the signal to a higher network layer, where it can be switched by another portion of the matrix M laying on the matrix board MB.

In this latter case, the Ethernet signal is directed to the Multi-Service Plug-In Module, where it is adapted by the L2 so-sk adaptation function. Afterwards, the Ethernet signal may be terminated according to the SDH—Lower Order layer by the Lower Order Path Termination function (LPT so-sk) and then be transmitted through the backpanel driver BKP1 to the matrix board, where a portion of the matrix M performs SDH—Lower Order switching. The signal can be switched either to the output of the matrix board MB connected to input/output port devices (not shown in FIG. 7), or to an output of the matrix board MB connected to the adapter device AD2. The adapter device AD2 can adapt the signal through the Higher Path Adaptation function (HPA sk-so) and terminate it according to the SDH—Higher Order layer through the Higher Order Path Termination function (HPT so-sk). The signal can finally be transmitted to the matrix board MB through the backpanel driver BKP2, where another portion of the matrix M performs SDH—Higher Order switching.

Alternatively, the Ethernet signal at the input of the L2 board can be directed to the Multi-Service Plug-In Module, where it is adapted by the L2 so-sk function and then directly terminated according to the SDH—Higher Order layer through the Higher Order Path Termination function (HPT so-sk). Then, the signal can be sent through the backpanel driver BKP1 to the matrix board MB, where a portion of the matrix M performs SDH—Higher Order switching.

Alternatively, the Ethernet signal at the input of the L2 board can be directed to the Multi-Service Plug-In Module, where it is adapted by the L2 so-sk function and then directly terminated according to the Optical Data Unit layer through the Optical Data Unit termination function (ODU so-sk). Then, the signal can be sent through the backpanel driver BKP1 to the matrix board MB, where a portion of the matrix performs ODU switching.

At the input of the apparatus P shown in FIG. 7 it is also possible to have STM-N frames according to the SDH/Sonet layer. The STM-N frames are received by the apparatus P through the SDH board, where they undergo termination though the Transport Terminal Function (TTF sk-so) and processing through an HVC block. Finally, the frames are sent via backpanel driver BKP3 to the matrix board MB, where a further portion of the matrix M performs SDH Higher Order switching.

It is important to notice that all the aforesaid switching functions (packet switching, SDH—Lower Order switching, SDH—Higher Order switching and ODU switching), performed by different portions of the matrix M laying on the matrix board MB, are actually the same switching function, as termination of signals according to different layers is implemented before entering the matrix board. Nevertheless, according to the format of the terminated signals entering the matrix board through the backpanel drivers of the input/output port devices and of the adapter devices, this switching function corresponds to:

an L2 switching function in case of packet-terminated signals; or a Lower Order Path Connection switching function (LPC) in case of SDH—Lower Order terminated signals; or a Higher Order Path Connection switching function (HPC) in case of SDH—Higher Order terminated signals; or finally an ODU switching function in case of ODU terminated signals.

In other words, each portion of the matrix M laying on the matrix board MB is able to switch every type of incoming signal, according to the type of input/output port device or adapter device connected to it.

The following describes an implementation of the concept of a multi-service node, which switches packet and TDM traffic both using a single switch matrix that is transparent with respect to the signal format. One example is a switch that is capable of switching packets and TDM forms in an integrated telecommunication network.

Figure 8:
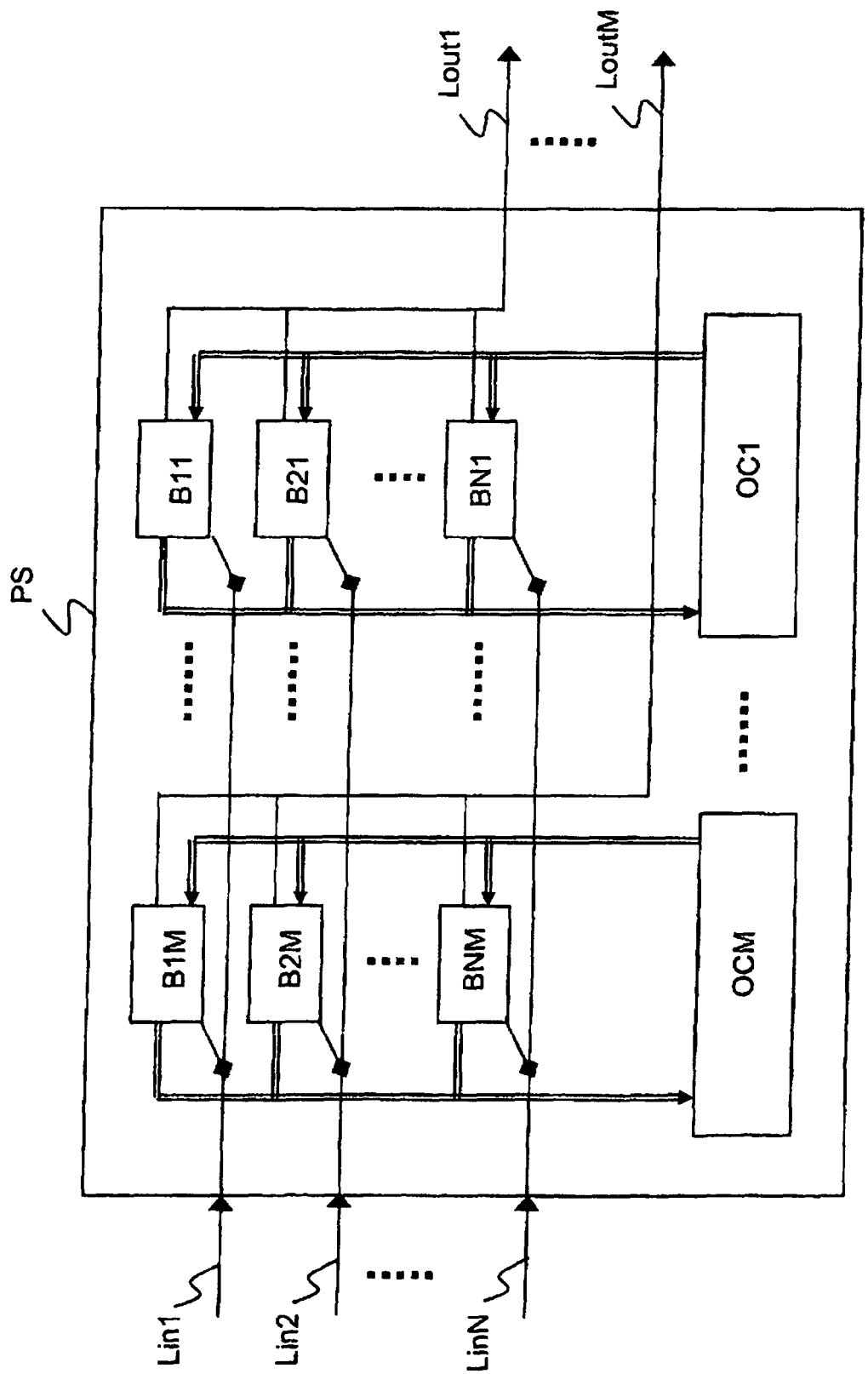
FIG. 8 schematically shows a known packet switch.

FIG. 8 schematically shows a known packet switch PS. The packet switch PS is connected to a number N of input lines Lin1, Lin2, . . . , LinN, and to a number M of output lines Lout1, . . . LoutM. The packet switch PS further comprises N.times.M buffers. More particularly, the first input line Lin1 is connected to M buffers B11 . . . B1M; the second input line Lin2 is connected to M buffers B21, . . . B2M; and the N.sup.th input line LinN is connected to M buffers BN1, . . . BNM. The packet switch PS further comprises M output controllers OC1, . . . OCM. In particular, the buffers B11, B21, . . . BN1 are connected the output controller OC1; and the buffers B1M, B2M, . . . BNM are connected to the output controller OCM. Moreover, the buffers B11, B21, . . . BN1 are connected to the output line Lout1, and the buffers B1M, B2M, . . . BNM are connected to the output line LoutM.

The operation of the packet switch PS, which has already been described in the introduction of the present description, will be only briefly summarized herein after.

A packet incoming through the input line Lin1 is stored in one of the buffers B11, . . . B1M, according to the content of its overhead. In each buffer, packets are stored in a queue, waiting to be taken by the corresponding output line Lout1, . . . . LoutM. The same considerations apply also to the other input lines Lin2, . . . LinN.

The output controller OC1 associated to the output line Lout1 receives from the buffers B11, B21, . . . BN1 information about the status of the queue of each of buffers B11, B21, . . . BN1. According to these information, the output controller OC1 determines the order according to which packets into the buffers B11, B21, . . . BN1 must be taken by the output line Lout1. The same considerations apply also to the other output lines Lout2, . . . LoutM.

Figure 9:
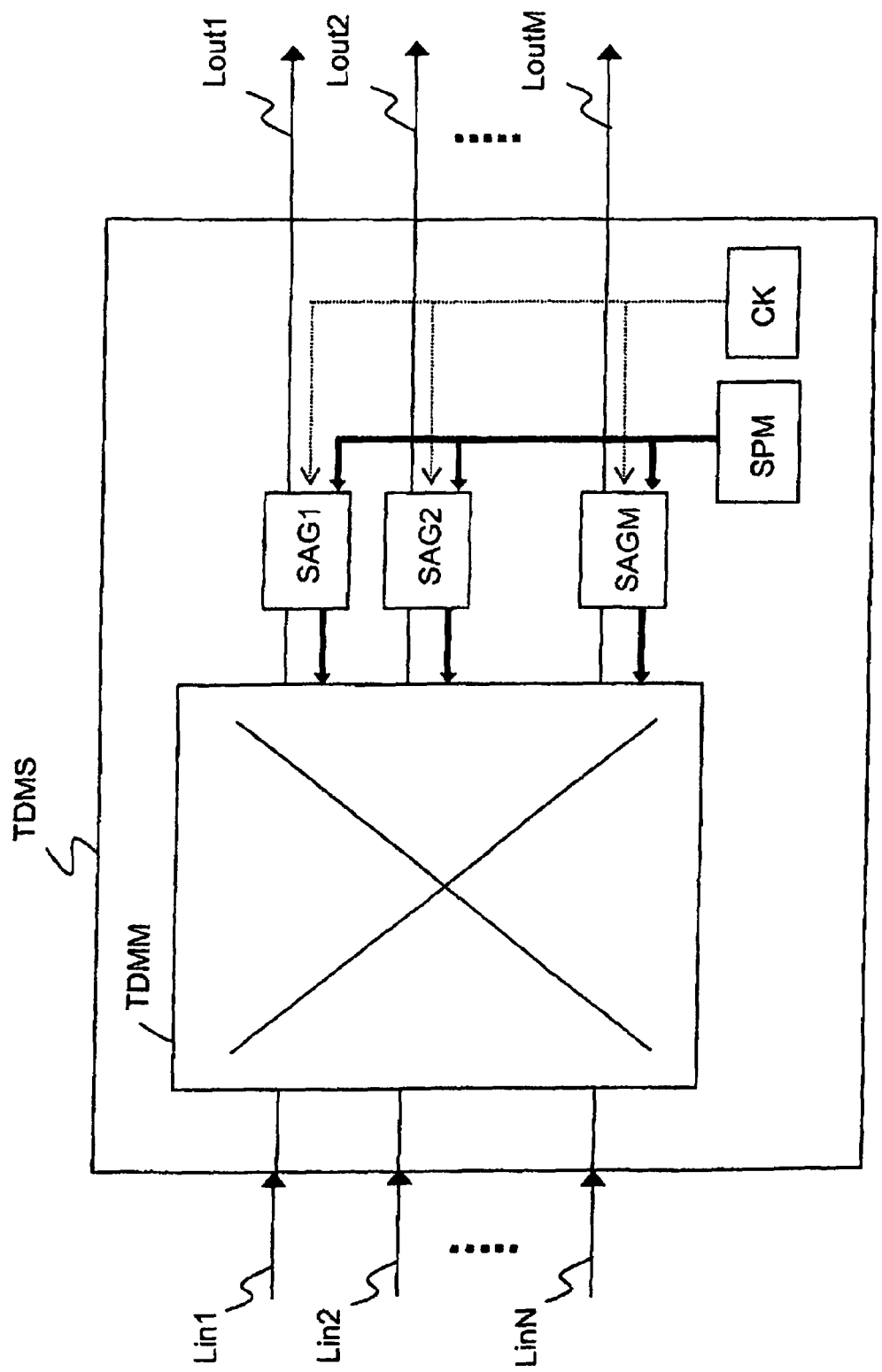
FIG. 9 schematically shows a known TDM switch.

FIG. 9 schematically shows a known TDM switch. The TDM switch TDMS is connected to a number N of input lines Lin1, Lin2, . . . LinN and to a number M of output lines Lout1, Lout2, . . . LoutM. The TDM switch TDMS further comprises a TDM matrix TDMM. The matrix TDMM may be implemented as a memory. Each matrix output is connected to a respective source address generator SAG1, SAG2, . . . SAGM. The switch TDMS further comprises a clock module CK, which is adapted to recover the reference clock signal of the synchronous network and to provide it to the source address generators SAG1, SAG2, . . . SAGM. Besides, the source address generators are connected to a static provisioning module SPM. The static provisioning module SPM is adapted to provide the source address generators SAG1, SAG2, SAGM with a static routing table. As already mentioned, the static routing table indicates, for each matrix output, an ordered list of the tributary channels that must be taken. According to the static routing table provided by the static provisioning module SPM, each source address generator SAG1, SAG2, . . . SAGM generates, for the respective matrix output, an ordered list of source addresses indicating the memory position of the tributary channels that must be taken. Hence, each matrix output sends to the respective output line a TDM flow, which is composed by the taken tributary channels.

Figure 10:
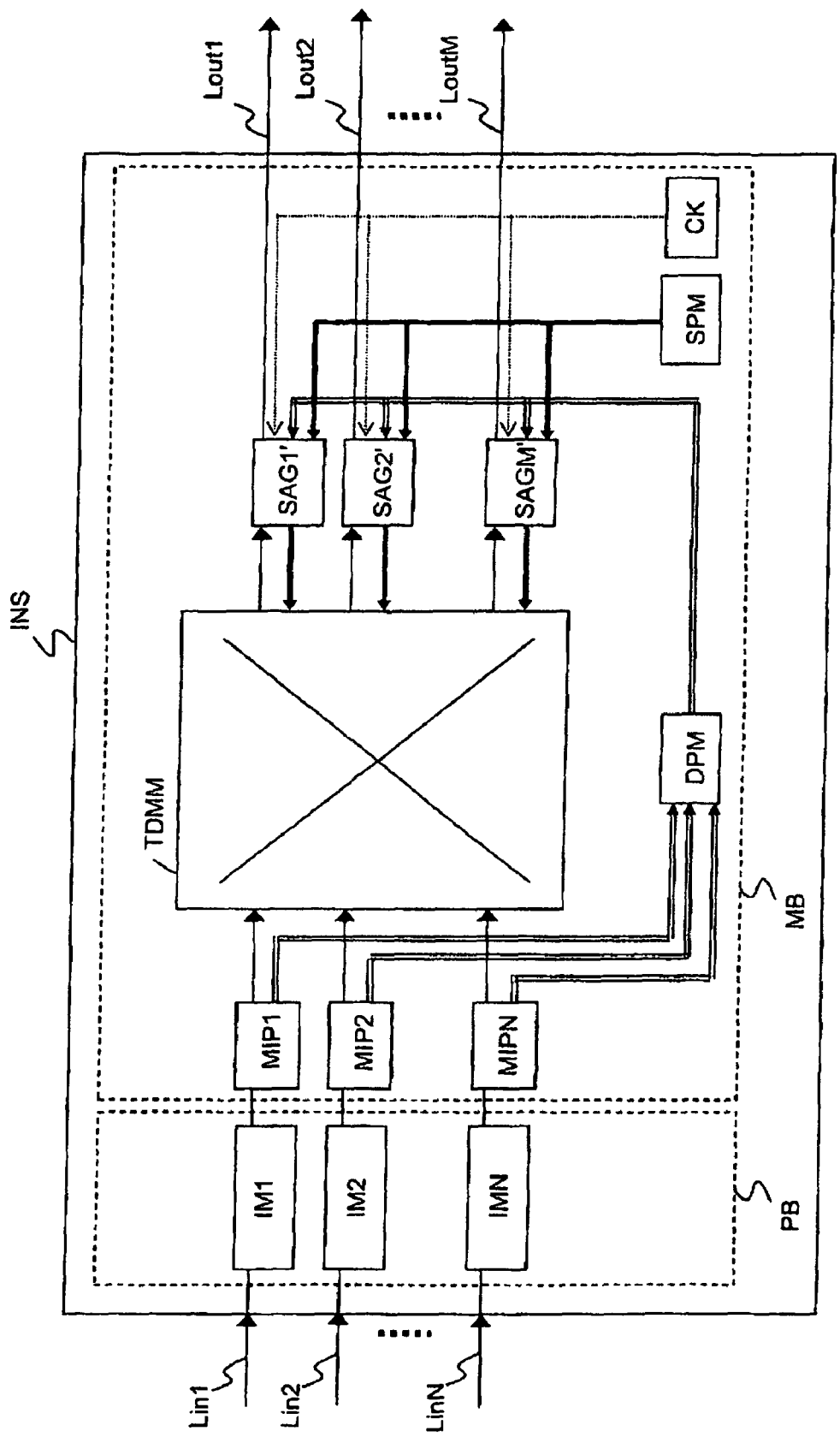
FIG. 10 schematically shows a switch for integrated networks according to the present method and apparatus.

FIG. 10 schematically shows a switch for integrated telecommunication networks according to the present method and apparatus. The switch for integrated networks INS is connected to a number N of input lines Lin1, Lin2, . . . LinN and to a number M of output lines Lout1, Lout2, . . . LoutM. Each input line Lin1, Lin2, . . . LinN enters the switch INS through a respective input module IM1, IM2, . . . IMN. The switch INS further comprises a TDM matrix TDMM, having N matrix inputs and M matrix outputs (not shown in FIG. 10). The matrix TDMM may be implemented as a memory. Each input module IM1, IM2, . . . IMN is connected to a respective matrix input through a respective matrix input processing module MIP1, MIP2, . . . MIPN. Each matrix output is provided with a respective source address generator SAG1', SAG2', . . . SAGM'. The switch INS further comprises a clock module CK, which is adapted to recover a reference clock signal of the synchronous network and to provide it to the source address generators SAG1', SAG2', . . . SAGM'. Besides, each source address generator SAG1', SAG2', . . . SAGM' is connected to a static provisioning module SPM. The switch INS, according to the present method and apparatus, comprises also a dynamic provisioning module DPM. Each matrix input processing module MIP1, MIP2, . . . MIPN is connected to the dynamic provisioning module DPM. The output of the dynamic provisioning module DPM is connected to all the source address generators SAG1', SAG2', . . . SAGM'.

It has to be noticed that typically the input modules IM1, IM2, . . . IMN are implemented on a port board PB, together with other port devices (not shown in FIG. 10). On the other hand, the TDM matrix, the matrix input processing modules, the source address generators, the static provisioning module and the dynamic provisioning module are typically implemented through one or more chips on a same matrix board MB, which is separated from the port board PB. In another embodiment (not shown), only a single board is provided for input modules, TDM matrix, matrix input processing modules, source address generators, static provisioning module and dynamic provisioning module, which may be implemented either through one or more chips. According to a preferred embodiment of the present method and apparatus, the memory implementing the TDM matrix is a data RAM memory, which is divided into two parts. While a first part is being written by the matrix inputs, a second part is being read by the matrix outputs, and vice versa.

According to a preferred embodiment of the present method and apparatus, the memory is implemented as a number of memories working in parallel. This allows for a speed up of the reading functions performed by the matrix outputs.

According to a preferred embodiment of the present method and apparatus, the TDM matrix comprises a main matrix and a spare matrix, which is substantially identical to the main matrix. Typically, incoming traffic is bridged both to the main matrix and to the spare matrix, which both perform switching at the same time. Output ports (not shown) receive output flows both from the main and spare matrices. During normal operation, the output ports select the flows from the main matrix. Should the main matrix become failed, the output ports will select the flows from the spare matrix.

Herein after, by referring to FIGS. 10, 11a and 11b, a detailed description of the switch INS operation according to the present method and apparatus will be provided.

According to the present method and apparatus, each input line Lin1, Lin2, . . . LinN of the switch INS is adapted to receive a respective information flow, which may comprise only TDM flows, packets or both TDM flows and packets. According to the present method and apparatus, each information flow incoming at the switch INS through the input line Lin1, Lin2, . . . LinN, is divided by the respective input modules IM1, IM2, . . . IMN in blocks having fixed size. Additional processing functions of the input flows are performed by other port devices, which are not described, as they are not relevant for the present description.

Figure 11A:
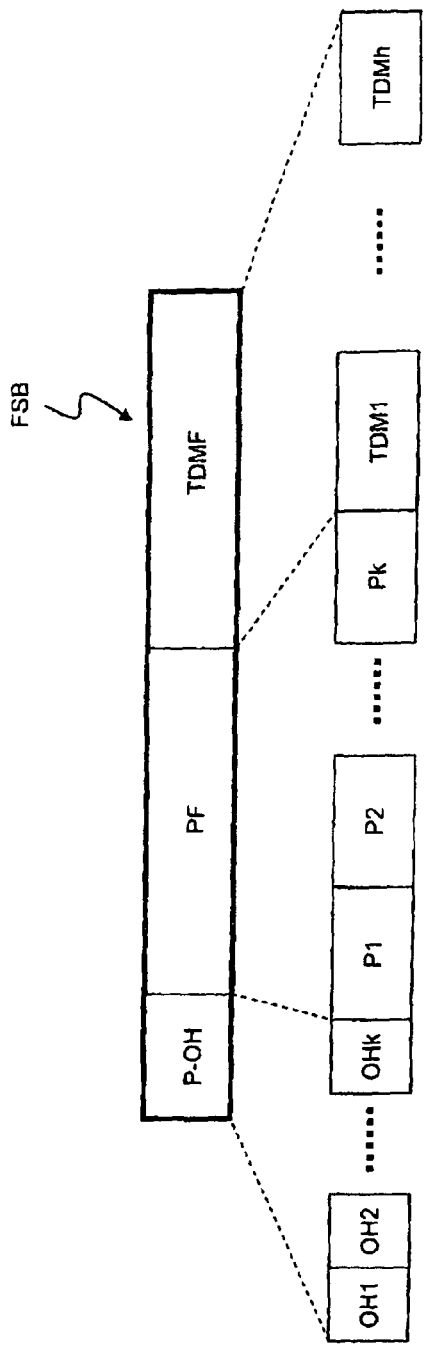
FIGS. 11a and 11b schematically show blocks as generated by an input module according to the present method and apparatus.

FIG. 11a schematically shows the structure of an example of a block generated by an input module. The fixed-size block FSB comprises a packet overhead field P-OH, a packet field PF and a TDM field TDMF. The packet field PF comprises a number k of packets P1, P2, . . . Pk. Such packets may have all the same size, or they can have different sizes, according to the protocol transporting them. The overall dimension of the packet field PF is thus variable, and it depends both on the number k of packets and on the size of each packet. The packets P1, P2, . . . Pk are arranged into the packet field PF according to a predefined order. For instance, in a preferred embodiment of the method and apparatus, packets are arranged according to their respective destination output lines, as it will be shown in greater detail by referring to FIG. 12.

The packet overhead field P-OH comprises the overheads of the packets P1, P2, . . . Pk. Preferably, the overheads are arranged according to the same predefined order as the packets. Thus, the packet overhead field P-OH comprises the overhead OH 1 of the packet P1, the overhead OH2 of the packet P2 and the overhead OHk of the packet Pk.

Finally, the fixed-size block FSB may comprise a portion of a TDM flow. It has to be noticed that the TDM field may comprise different portions TDM1, . . . TDMh of different TDM flows. For instance, the TDM field may comprise portions of unicast TDM flows (e.g. SDH frame, Sonet frame), and/or portions of a multicast/broadcast TDM flow (e.g. a video signal). Switching of multicast/broadcast TDM flows will be described in detail with reference to FIG. 13.

It must be noticed that the composition of each fixed size block dynamically changes according to the composition of the traffic flow. For instance, one or more tributary channels of the TDM flow may be switched off, or the transmission of a video signal may finish. In these cases, the size of the TDM field decreases, and consequently the packet field size and the packet overhead field size increase. This is shown in FIG. 11b, which shows two consecutive blocks FSB1, FSB2 generated by a same input module according to the present method and apparatus. It can be noticed that the size of the TDM field TDMF1 of the first block FSB1 is larger than the size of the TDM field TDMF2 of the second block FSB2. Thus, in the block FSB2, a larger portion of the block is available for arranging packets and their overheads.

It has to be noticed that, if the incoming information flow comprises only packets, there is no TDM field into the block. Similarly, if the incoming information flow comprises only TDM flows, there are no packet overhead field and packet field into the block, as it will be shown herein after, with reference to FIG. 13.

After each input module IM1, IM2, . . . IMN has generated a respective block as shown in FIGS. 11a and 11b, each input module sends it to the respective matrix input processing module MIP1, MIP2, . . . MIPN. Each matrix input processing module MIP1, MIP2, . . . MIPN drops the packet overhead field P-OH from the respective block, and sends it to the dynamic provisioning module DPM.

The dynamic provisioning module DPM, according to the content of the packet overhead fields received from the matrix input processing modules, generates a dynamic routing table. More specifically, the dynamic routing table may contain, for each matrix output:

the starting memory address of each packet that the matrix output has to take, and the size of each packet that the matrix output has to take.

The dynamic provisioning module DPM sends such a dynamic routing table to the source address generators SAG1', SAG2', . . . SAGM'. Furthermore, the source address generators SAG1', SAG2', . . . SAGM' receive from the static provisioning module SPM a static routing table relative to the TDM portions. Therefore, by processing both the dynamic routing table and the static routing table, each source address generator SAG1', SAG2', . . . SAGM' generates, for its respective matrix output, an ordered list of source addresses, i.e. an ordered list of memory addresses from where the matrix output may take packets and TDM portions.

Thus, according to the present method and apparatus, both TDM flows and packets are switched by the same TDM matrix, which is controlled by means of the source address of the matrix outputs. Source addresses may be generated either dynamically (for packets) or statically (for portions of TDM flows).

It has to be noticed that, advantageously, according to the present method and apparatus, failures or down times of the main matrix can be managed in a substantially transparent manner. In fact, as switching is performed by a TDM matrix, which is controlled by means of its outputs, and all the incoming traffic is bridged both to the main and to the spare matrixes, managing main matrix failures can be performed in a "hitless" manner, i.e. without loosing any portion of the incoming traffic.

Figure 11B:
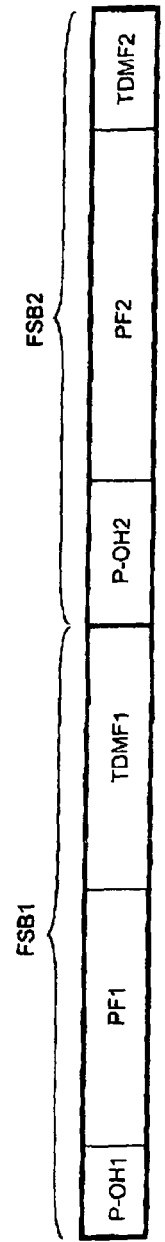

Besides, as already mentioned with reference to FIG. 11b, the composition of a block may be different from the composition of the following block. In particular, changes in TDM flows and/or in packets result in changes of the TDM field size and packet field size (see blocks FSB1 and FSB2 of FIG. 11b). As already mentioned, the memory is divided into two parts. The two parts are able to store succeeding blocks. While a first part is being written by the matrix inputs, a second part is being read by the matrix outputs, and vice versa. For instance, with reference to FIG. 11b, while first block FSB1 is being read from a first memory part, the second block FSB2 is being written into a second memory part. According to the present method and apparatus, in such a situation the dynamic routing table allows to upgrade in real time the packets source addresses, while a new static routing table must be provided in order to update the TDM portions source addresses. In a preferred embodiment of the method and apparatus, a plurality of static routing tables may be provided to the source address generators, each routing table corresponding to a different block composition. For instance, by referring to FIG. 11b, two static routing tables may be provided both for the block FSB1 and for the block FSB2, respectively. In this way, a delayed provisioning of the new static routing table is avoided, and TDM portion source addresses can be transparently updated.

An example of the method for switching both TDM flows and packets according to the present method and apparatus will be now described with reference to FIG. 12.

Figure 12:
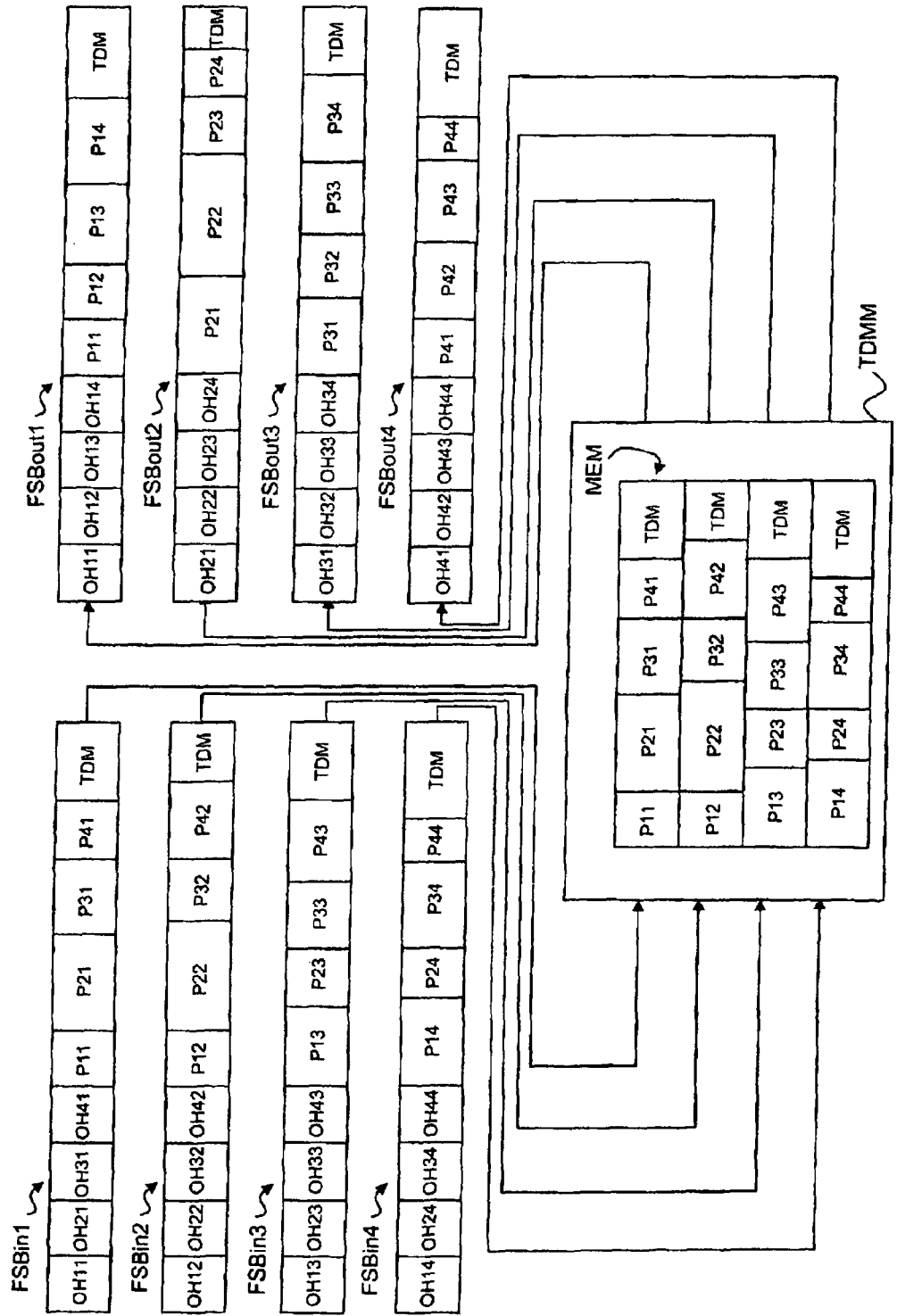
FIG. 12 schematically shows an example of the method for switching TDM flows and packets according to the present method and apparatus.

FIG. 12 shows a TDM matrix having four matrix inputs and four matrix outputs. Each input module (not shown) provides the respective matrix input processing module (not shown) with a fixed size block FSBin1, FSBin2, FSBin3, FSBin4. Each block comprises both a packet field, and a TDM field. More particularly, each block comprises four packets, each packet being addressed to a different destination matrix output, and a number of TDM portions. In the following description, only packet switching will be described in detail; on the contrary, a detailed description of the switching of the TDM flow can be found into the description of FIG. 9.

As mentioned above, according to the present method and apparatus, each input module arranges packets according to a predefined order. In FIG. 12, packets are ordered according to their destination matrix outputs. In FIG. 12 each packet is marked with two indexes; a first index indicates the matrix output the packet is addressed to (destination matrix output), while the second index indicates the matrix input the packet comes from (source matrix input). Thus, the fixed size block FSBin1 comprises packets P11, P21, P31 e P41. Similarly, the fixed size block FSBin2 comprises packets P12, P22, P32 e P42. Similarly, the fixed size block FSBin3 comprises packets P13, P23, P33 e P43. Finally, the fixed size block FSBin4 comprises packets P14, P24, P34 e P44. It has to be noticed that, as already mentioned, packets have different sizes, so that packet fields of the four blocks have different sizes.

Each block FSBin1, FSBin2, FSBin3, and FSBin4 further comprises a packet overhead field, which in turn comprises the packet overheads arranged according to the same predefined order of packets. Thus, the packet overhead field of the block FSBin1 comprises the overhead OH11 of the packet P11, the overhead OH21 of the packet P21, the overhead OH31 of the packet P31, and the overhead OH41 of the packet P41. Similar considerations apply also to blocks FSBin2, FSBin3 and FSBin4.

Each overhead may for instance comprise packet size, an identifier of the destination matrix output and an identifier of the source matrix input. Thus, the overhead OHyx of a packet Pyx may be expressed as:

$$OHyx = (W_{yx}, y, x),$$

wherein $W_{yx}$ is the size of the packet Pyx, y is the identifier of the destination matrix output of the packet Pyx and x is the identifier of the source matrix input of the packet Pyx. It has to be noticed that, as the order according to which packets are arranged in a block is predefined, the identifier of the destination matrix output and the identifier of the source matrix input can be omitted. In this case, even if a packet has size equal to 0, its overhead cannot be omitted, in order to preserve the predefined order.

As already mentioned, a TDM matrix may be implemented as a memory. When a TDM matrix switches TDM flows, matrix inputs are able to write at predetermined memory addresses, while the matrix outputs are able to read from predetermined memory addresses. Similarly, the TDM matrix TDMM comprised into the switch INS according to the present method and apparatus may be implemented as a memory. However, as the switch INS according to the method and apparatus is adapted to switch variable size packets, the memory positions wherein packets are stored dynamically change according to packet size.

FIG. 12 shows an example of a TDM matrix TDMM comprising a two-dimensional memory MEM, i.e. a memory comprising a number of rows and a number of columns. Thus, a memory address comprises a row address and a column address.

Under the assumption that each matrix input writes the packets of the respective block one after the other into a respective row of the memory MEM, the column addresses of the packets comprised in the block FSBin1 are:

column address of packet P11: 0;
column address of packet P21: $W_{11}$;
column address of packet P31: $W_{11}+W_{21}$;
column address of packet P41: $W_{11}+W_{21}+W_{31}$; and
column address of the first TDM word: $W_{11}+W_{21}+W_{31}+W_{41}$.

Similarly, the column addresses of the packets comprised in the block FSBin2 are:

column address of packet P12: 0;
column address of packet P22: $W_{12}$;
column address of packet P32: $W_{12}+W_{22}$;
column address of packet P42: $W_{12}+W_{22}+W_{32}$; and
column address of the first TDM word: $W_{12}+W_{22}+W_{32}+W_{42}$.

Similar considerations apply to blocks FSBin3 and FSBin4. Thus, each memory row comprises one after the other packets comprised in a block of a respective matrix input, as shown in FIG. 12.

As each packet address dynamically varies with the size of all the packets comprised into the block, the present method and apparatus provides a dynamic provisioning module DPM. The dynamic provisioning module DPM processes the packet overhead field of each block, in order to generate a dynamic routing table. As already mentioned, for each matrix output, the dynamic routing table comprises the starting address of the packets that the matrix output has to take, and the size of each packet that the matrix output has to take.

For instance, for the first matrix output, the dynamic routing table provides:

for packet P11: row 0, column 0, size=$W_{11}$;
for packet P12: row 1, column 0, size=$W_{12}$;
for packet P13: row 2, column 0, size=$W_{13}$; and
for packet P14: row 3, column 0, size=$W_{14}$.

For the second matrix output, the dynamic routing table provides:

for packet P21: row 0, column $W_{11}$, size=$W_{21}$;
for packet P22: row 1, column $W_{12}$, size=$W_{22}$;
for packet P23: row 2, column $W_{13}$, size=$W_{23}$; and
for packet P24: row 3, column $W_{14}$, size=$W_{24}$.

For the third matrix output, the dynamic routing table provides:

for packet P31: row 0, column $W_{11}+W_{21}$, size=$W_{31}$;
for packet P32: row 1, column $W_{12}+W_{22}$, size=$W_{32}$;
for packet P33: row 2, column $W_{13}+W_{23}$, size=$W_{33}$; and
for packet P34: row 3, column $W_{14}+W_{24}$, size=$W_{34}$.

Finally, for the fourth matrix output, the dynamic routing table provides:

for packet P41: row 0, column $W_{11}+W_{21}+W_{31}$, size=$W_{41}$;
for packet P42: row 1, column $W_{12}+W_{22}+W_{32}$, size=$W_{42}$;
for packet P43: row 2, column $W_{13}+W_{23}+W_{33}$, size=$W_{43}$; and
for packet P44: row 3, column $W_{14}+W_{24}+W_{34}$, size=$W_{44}$.

The dynamic provisioning module DPM provides the dynamic routing table to the source address generators. The source address generators, according to the information generate the source addresses, i.e. the memory addresses of each word of each packet.

Further, each source address generator is able to determine the starting address of the TDM portions. For instance, for the first row, corresponding to the first matrix input, the starting address of the TDM portion is given by the following formula:

$$\sum_{y=1}^{M} W_{y1} \quad (1)$$

Similar formulas can be applied for the other rows. Further, as each block has a fixed dimension, the formula (1) also allows the source address generators to determine the dimension of the TDM field TDMF.

Similarly, the source address generators are able, for each matrix output, to determine the starting address of the TDM portions. More particularly, by estimating, for the first matrix output:

$$\sum_{x=1}^{N} W_{x1} \quad (2)$$

The source address generator of the first matrix output estimates the address wherein dynamic switching is replaced by static switching. Similar considerations also apply to the other matrix outputs.

It must be noticed that, for avoiding congestion of the TDM matrix, for each matrix output the following condition must be fulfilled:

$$\sum_{x=1}^{N} W_{yx}, \le C_y \quad (3)$$

wherein x is the matrix input identifier, y is the matrix output identifier, and $C_y$ is the capacity of the matrix output y.

Besides, for avoiding congestion also the following condition must be fulfilled for each matrix input:

$$\sum_{y=1}^{M} W_{yx}, \le C_x \quad (4)$$

wherein $C_x$ is the capacity of the matrix input x.

According to the present method and apparatus, congestion management is performed by a suitable congestion management algorithm. The congestion management algorithm determines, for each block, the maximum number of packets that the block may comprise and the maximum size of each packet comprised into the block, in order to assure that the conditions expressed by (3) and (4) are fulfilled.

In a preferred embodiment of the present method and apparatus, the congestion management algorithm is implemented on a dedicated device, which is generally termed central scheduler, which is not shown in FIGS. 11a and 11b. This central scheduler, in a preferred embodiment of the method and apparatus, is implemented on a chip, which is located on the matrix board.

Figure 13:
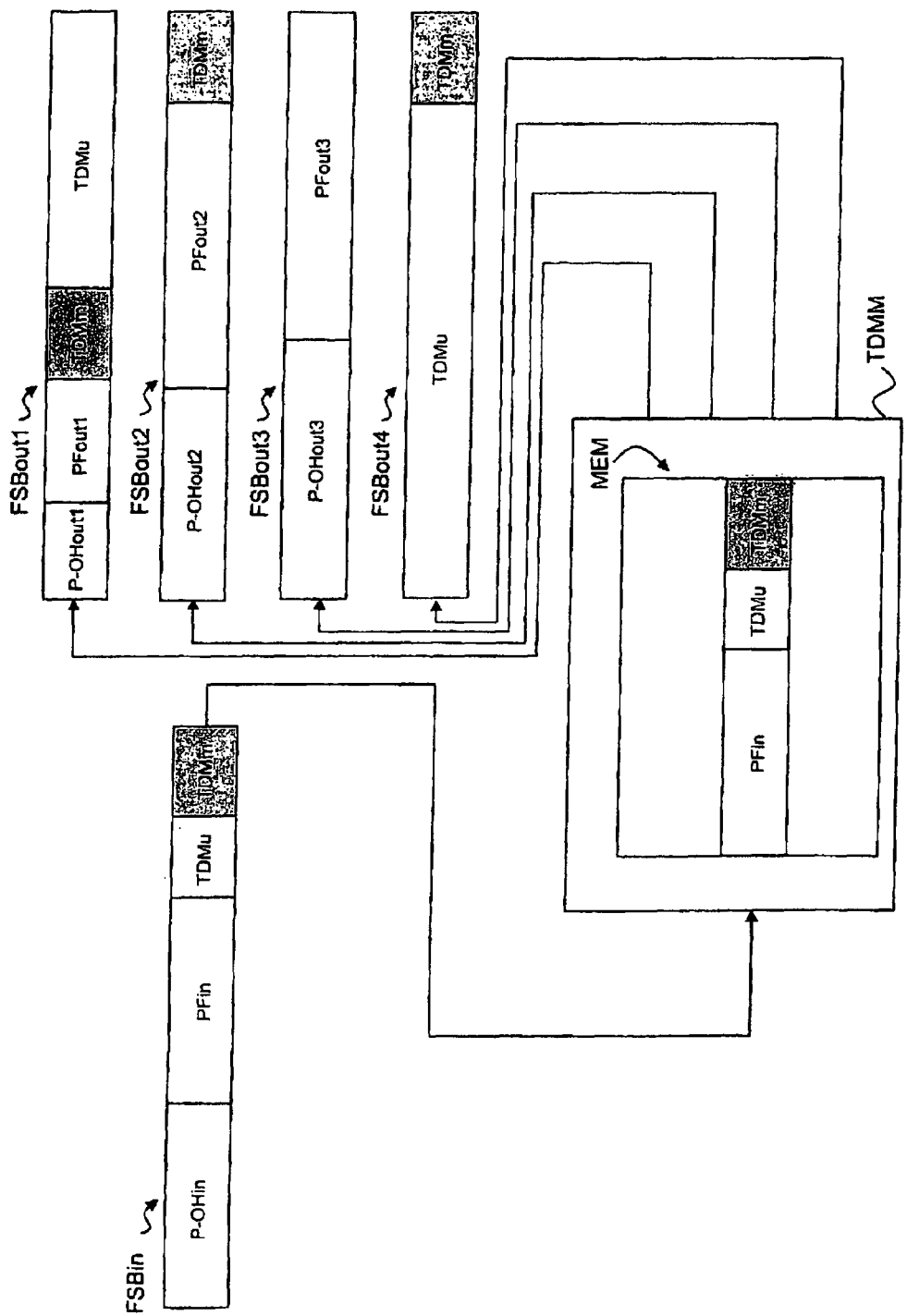
FIG. 13 shows an example of the method for switching TDM multicast flows according to the present method and apparatus.

FIG. 13 shows an example of the method for switching TDM multicast flows according to the present method and apparatus. FIG. 13 shows a TDM matrix TDMM having a number of matrix input; for simplicity, only a matrix input is shown in FIG. 13. Such a matrix input receives from the corresponding input module (not shown in FIG. 13) a block FSBin, which comprises a packet overhead field P-OHin, a packet field PFin and a TDM field. As already mentioned, a TDM field may comprise portions of different TDM flows. For instance, the TDM field of the block FSBin comprises a portion TDMu of a unicast flow (e.g. a portion of an SDH TDM flow). The TDM field of the block FSBin further comprises a portion TDMm of a multicast flow (e.g. a portion of a video signal). The TDM matrix of FIG. 13 is provided with four matrix outputs. It is assumed that the portion TDMm of multicast flow is addressed to the first, second and fourth matrix outputs (not to the third matrix output).

According to the present method and apparatus, the matrix input simply writes the multicast flow portion TDMm into the memory MEM of the matrix TDMM as described by referring to FIG. 12. Thus, only a single copy of the portion TDMm is stored into the memory MEM, and each destination matrix output is simply required to read the copy of the portion TDMm from its source address. As it can be observed in FIG. 13, each of the first, second and fourth destination matrix outputs reads the portion TDMm from the memory MEM and inserts it into its respective output block FSBout1, FSBout2, FSBout4. The position of the portion TDMm into each output block depends both on static and on dynamic routing tables. It can be noticed, that, as already mentioned, no packet is addressed to the matrix output 4. In this case, the whole fixed-size block FSBout4 comprises TDM portions, and neither the packet field PF nor the packet overhead field P-OH is included into the block.

Thus, according to the present method and apparatus, multicasting is implemented by source address generators and by the matrix outputs, while matrix inputs and the memory are not required to create and store, respectively, a plurality of copies of the TDMm portion. This allows reduces the processing complexity of multicasting and broadcasting transmissions.

We claim:

1. A switch for telecommunication networks, comprising:
   termination and adaptation function means handling incoming signals and interfacing different network layers;
   time division multiplexing matrix coupled to the termination and adaptation function means;
   the time division multiplexing matrix provided with a number of matrix inputs and a number of matrix outputs, the multiplexing matrix effecting switching of terminated and adapted signals for circuit switched network layers and packet switched network layers, and the multiplexing matrix configured for switching packets and time division multiplexing signals transparently at their own layers within the multiplexing matrix;
   source address generators, connected to matrix outputs of the time division multiplexing matrix;
   input modules, each of the input modules being configured to generate a fixed size block, the block comprising a number of packets, arranged according to a predefined order;
   matrix input processing modules, each of the matrix input processing modules connected to a respective input module to receive therefrom the fixed size block, and each of the matrix input processing modules further connected to a matrix input; and a dynamic provisioning module, which is configured to receive from the matrix input processing modules routing information comprised in the packets, that generates, according to the routing information, a dynamic routing table, and that supplies the dynamic routing table to the source address generators.

2. The switch according to claim 1, wherein further the switch comprises a static provisioning module which is configured to supply a static routing table to the source address generators.

3. The switch according to claim 2, wherein the fixed size block further comprises a portion of time division multiplexing flow.

4. The switch according to claim 3, further comprising a clock module for recovering from the time division multiplexing flow a reference clock signal, and supplying the reference clock signal to the source address generators.

5. The switch according to claim 1, wherein routing information is sent to the dynamic provisioning module according to a predefined order.

6. The switch according to claim 5, wherein the predefined order corresponds to the order of matrix outputs to which packets are addressed.

7. The switch according to claim 1, wherein the time division multiplexing matrix comprises a memory, wherein the matrix inputs are configured to write into the memory, and wherein the matrix outputs are configured to read from the memory.

8. The switch according to claim 7, wherein each of the matrix inputs writes the packets into the memory according to the predefined order, in contiguous positions.

9. The switch according to claim 8, wherein the routing information comprise a packet size.

10. The switch according to claim 9, wherein the source addresses of the packets are generated according to the packet size.

11. The switch according to claim 1, wherein the switch is at least partially implemented in an application specific integrated circuit.

12. A multi-service apparatus for an integrated transport network having a plurality of signal layers, the apparatus comprising:

termination and adaptation function means handling incoming signals and interfacing different network layers;

transparent electrical matrix coupled to the termination function means and the adaptation function means, the transparent electrical matrix being a time division multiplexing matrix operatively coupled to inputs, the matrix switching signals according to network layers, both circuit switched and packet switched;

the termination and adaptation function means implemented in input/output port devices; and the transparent electrical matrix exclusively performing switching of incoming signals that are already terminated by the input/output port devices and adapted by the adapter devices for circuit switched network layers and packet switched network layers, and wherein the transparent electrical matrix is transparent with respect to respective signal formats of the incoming signals.

13. The apparatus according to claim 12, wherein a separate adapter device is provided for at least one pair of termination and adaptation function means between adjacent signal layers.

14. The apparatus according to claim 13, wherein the adjacent signal layers are selected from a group consisting of: Ethernet layer—Multi Protocol Label Switching layer; Multi Protocol Label Switching layer—Resilient Packet Ring layer; Resilient Packet Ring layer—SDH (Synchronous Digital Hierarchy) Lower Order layer; SDH Lower Order layer—SDH Higher Order layer; and SDH Higher Order layer—Optical Data Unit layer.

15. The apparatus according to claim 12, wherein the input/output port devices have a separate adapter device for at least one pair of termination and adaptation function means between non-adjacent signal layers.

16. The apparatus according to claim 15, wherein the non-adjacent signal layers are selected from the group consisting of: Multi Protocol Label Switching layer—SDH (Synchronous Digital Hierarchy) Higher Order layer; Multi Protocol Label Switching layer—Optical Data Unit layer; Resilient Packet Ring layer—SDH Higher Order layer; and Resilient Packet Ring layer—Optical Data Unit layer.

17. The apparatus according to claim 12, wherein the input/output port devices have a separate adapter device for at least one pair of termination and adaptation function means between adjacent signal layers and wherein the input/output port devices have a further separate adapter device for at least one pair of termination and adaptation function means between non-adjacent signal layers.

18. The apparatus according to claim 12, wherein at least one of the input/output port devices comprises packet termination function means.

19. The apparatus according to claim 18, wherein the apparatus further comprises a first backpanel driver for transmitting terminated packet signals to the transparent electrical matrix for performing packet layer switching.

20. The apparatus according to claim 18, wherein the packet termination function means, a selector and the plug-in module are arranged on a first board.

21. The apparatus according to claim 18, wherein the apparatus further comprises a selector, the selector receiving packet signals and outputting the received packet signals to either the packet termination function means or to a plug-in module which converts the packet signals into time division multiplex signals and terminates the packet signals on a time division multiplex layer.

22. The apparatus according to claim 21, wherein the plug-in module comprises: Lower Order Path Termination means, Higher Order Path Termination means; and Optical Data Unit termination means.

23. The apparatus according to claim 21, wherein a first backpanel driver transmits signals from the plug-in module to the transparent electrical matrix for performing time division multiplex layer switching.

24. The apparatus according to claim 12, wherein at least one of the input/output port devices comprises time division multiplex termination function means and processing means.

25. The apparatus according to claim 24, wherein the apparatus further comprises a second backpanel driver for transmitting terminated/processed time division multiplex signals to the transparent electrical matrix for performing time division multiplex layer switching.

26. The apparatus according to claim 24, wherein the time division multiplex termination function means and the processing means are arranged on a second board.

27. The apparatus according to claim 12, wherein the apparatus further comprises a higher order adaptation board receiving lower order time division multiplex signals and outputting higher order time division multiplex signals, the higher order adaptation board in turn comprising an adapter device comprising adaptation function means and termination function means.

28. The apparatus according to claim 12, wherein the transparent electrical matrix has a total switching capacity, which is sharable by different signal layers of the signal layers.

29. The apparatus according to claim 12, wherein the apparatus further comprises an optical switch device transparent with respect to an incoming optical signal format.

30. The apparatus according to claim 29, wherein the optical switch device has a total optical switching capacity, which is sharable by different layer signals.

31. An integrated transport network comprising a plurality of multi-service apparatuses according to claim 12.

* * * * *